(12) United States Patent
Suzuki et al.

(10) Patent No.: US 11,651,569 B2
(45) Date of Patent: *May 16, 2023

(54) SYSTEM AND METHOD FOR MAPPING

(71) Applicant: MAGIC LEAP, INC., Plantation, FL (US)

(72) Inventors: Hélder Toshiro Suzuki, Mountain View, CA (US); Benjamin Wheeler Stiles, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,388

(22) Filed: Sep. 8, 2021

(65) Prior Publication Data

US 2021/0407207 A1 Dec. 30, 2021

Related U.S. Application Data

(63) Continuation of application No. 16/519,513, filed on Jul. 23, 2019, now Pat. No. 11,145,127.

(Continued)

(51) Int. Cl.
*G06T 19/00* (2011.01)
*G06T 15/10* (2011.01)
*G06F 3/01* (2006.01)

(52) U.S. Cl.
CPC ............ *G06T 19/006* (2013.01); *G06F 3/012* (2013.01); *G06T 15/10* (2013.01)

(58) Field of Classification Search
CPC ........ G06F 3/011; G06F 3/012; G06F 3/0304; G06T 15/10; G06T 17/00; G06T 19/006; G06T 2210/56; G06V 20/20
See application file for complete search history.

(56) References Cited

U.S. PATENT DOCUMENTS 9,791,700 B2   10/2017   Schowengerdt
10,295,338 B2   5/2019   Abovitz et al.
(Continued)

FOREIGN PATENT DOCUMENTS

WO   WO 2018/027206   2/2018

OTHER PUBLICATIONS

Foreign Response to EP Patent Appln. No. 19840583.9 dated Feb. 2, 2022.
(Continued)

*Primary Examiner* — Ming Wu
(74) *Attorney, Agent, or Firm* — Vista IP Law Group, LLP

(57) ABSTRACT

A computer implemented method for updating a point map on a system having first and second communicatively coupled hardware components includes the first component performing a first process on the point map in a first state to generate a first change. The method also includes the second component performing a second process on the point map in the first state to generate a second change. The method further includes the second component applying the second change to the point map in the first state to generate a first updated point map in a second state. Moreover, the method includes the first component sending the first change to the second component. In addition, the method includes the second component applying the first change to the first updated point map in the second state to generate a second updated point map in a third state.

19 Claims, 28 Drawing Sheets

Related U.S. Application Data

(60) Provisional application No. 62/702,322, filed on Jul. 23, 2018.

(56) References Cited

U.S. PATENT DOCUMENTS

| | | | |
|---|---|---|---|
| 11,145,127 | B2 | 10/2021 | Suzuki et al. |
| 2014/0323148 | A1 | 10/2014 | Schmalstieg et al. |
| 2015/0356782 | A1 | 12/2015 | Miller et al. |
| 2016/0026253 | A1* | 1/2016 | Bradski ............... H04N 13/128 345/8 |
| 2016/0041391 | A1 | 2/2016 | Van Curen et al. |
| 2016/0210785 | A1* | 7/2016 | Balachandreswaran ................. G02B 27/0172 |
| 2016/0284125 | A1* | 9/2016 | Bostick ................. G06F 3/012 |
| 2017/0039718 | A1* | 2/2017 | Kotake ................. G06T 7/73 |
| 2018/0274936 | A1* | 9/2018 | Choi .................... H04N 7/185 |

OTHER PUBLICATIONS

Foreign OA for CN Patent Appln. No. 201980049058.6 dated Nov. 29, 2021 (with English translation).

Foreign OA Response for CN Patent Appln. No. 201980049058.6 dated Mar. 18, 2022.

Foreign NOA for CN Patent Appln. No. 201980049058.6 dated Apr. 13, 2022.

Non-Final Office Action for U.S. Appl. No. 16/519,513 dated Nov. 9, 2020.

Final Office Action for U.S. Appl. No. 16/519,513 dated Feb. 17, 2021.

Amendment Response to NFOA for U.S. Appl. No. 16/519,513 dated Feb. 9, 2021.

Notice of Allowance for U.S. Appl. No. 16/519,513 dated Jun. 9, 2021.

PCT Invitation to Pay Additional Fees for International Appln. No. PCT/US19/42936, Applicant Magic Leap, Inc., dated Sep. 30, 2019 (2 pages).

PCT International Search Report and Written Opinion for International Appln. No. PCT/US19/42936, Applicant Magic Leap, Inc., dated Dec. 5, 2019 (10 pages).

Extended European Search Report for EP Patent Appln. No. 19840583.9 dated Jul. 6, 2021.

PCT International Preliminary Report on Patentability for International Appln. No. PCT/2019/042936, Applicant Magic Leap, Inc., dated Jan. 26, 2021 (6 pages).

Foreign OA for JP Patent Appln. No. 2021-503572 dated Dec. 27, 2022 (with English translation).

Foreign Response for JP Patent Appln. No. 2021-503572 dated Mar. 27, 2023.

\* cited by examiner

Map pads 1 of 2 mappad_init(uint32_t number_of_cells, uint32_t cell_size)

padview_mappad_reader(struct mappad*)
padview_mappad_writer(struct mappad*)

```
enum mappad_cell_owner {
          MAPPAD_CELL_OWNER_NONE
          MAPPAD_CELL_OWNER_MAP
          MAPPAD_CELL_OWNER_USB
} enum mappad_cell_state {
          MAPPAD_CELL_STATE_INVALID
          MAPPAD_CELL_STATE_MAP
          MAPPAD_CELL_STATE_USB
} enum mappad_cell_request {
          MAPPAD_REQUEST_NOP
          MAPPAD_REQUEST_INVALIDATE
          MAPPAD_REQUEST_SEND_AND_INVALIDATE
} struct mappad_cell {
          enum mappad_cell_owner owner
          enum mappad_cell_state state
          uint8_t data[cell_size]
} struct mappad {
          char name[]
          uint32_t cell_count
          struct mappad_cell cell[number_of_cells]
}
```

FIG. 26

Map pads 2 of 2

```
struct mappad_writer {
            uint32_t cell_count;
            enum mappad_cell_request request[number_of_cells]
            struct mappad_cell * cell_list[number_of_cells]
} struct mappad_reader {
            uint32_t cell_count;
            struct mappad_cell * cell_list[number_of_cells]
}
```

FIG. 27

SYSTEM AND METHOD FOR MAPPING

CROSS-REFERENCE TO RELATED APPLICATIONS

This application is a continuation of U.S. patent application Ser. No. 16/519,513, filed on Jul. 23, 2019, entitled "SYSTEM AND METHOD FOR MAPPING, which claims priority to U.S. Provisional Application No. 62/702,322, filed on Jul. 23, 2018, entitled "SYSTEM AND METHOD FOR MAPPING." The contents of the aforementioned patent applications are hereby expressly and fully incorporated by reference in their entirety, as though set forth in full.

FIELD OF THE INVENTION

The present disclosure relates to multiple component mapping and map synchronization systems, and method of mapping and synchronizing mapping across multiple components using same.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

Head-worn display devices that enable AR/MR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in AR/MR systems, optically render virtual content. Content is "virtual" in that if does not correspond to real physical objects located in respective positions in space. Instead, virtual content only exist in the brains (e.g., the optical centers) of a user of the head-worn display device when stimulated by light beams directed to the eyes of the user.

Some AR/MR systems use maps (e.g., topological maps, geometric maps, sparse point maps, etc.) of a real world environment to generate a passable world model for an AR/MR scenario. The passable world model facilitates interactions involving real world objects in the real world environment such (e.g., displaying a virtual object on a real world sofa). A sparse map is a fundamental building block for computing vision pose relative to a "stable" coordinate system. Environmental features become reference points in a 3D sparse map. Positions of reference points relative to the sensors defined the position or pose of the sensors. Sparse map can be built using data from multiple system components. A spare map allows tracking to facilitate permanence for virtual objects in a real world environment ("pixel stick"). Some AR/MR mapping related methods involve localization of the AR/MR device using topological maps to determine a position and pose of a user and/or an AR/MR device. Some AR/MR mapping related methods involve modeling real world objects of the AR/MR device using geometric maps to allow more accurate and realistic presentation of virtual objects. Some AR/MR systems generate and/or update maps of a (possible dynamic) real world environment using Simultaneous Localization and Mapping techniques.

As an example, localization allows a user wearing a head-worn display device to view a virtual object on the display while walking around an area where the virtual object appears. With updated position and pose data, the virtual object can be rendered for each viewpoint, giving the user the perception that they are walking around an object that occupies real space. If the head-worn display device is used to present multiple virtual objects, measurements of head pose can be used to render the scene to match the user's dynamically changing position and pose and provide an increased sense of immersion.

Maps can be generated, modified, and/or optimized using many methods and techniques. Some of these techniques involve new data. One such group of new data techniques is collectively called tracking and includes updating of map-point statistics, which may trigger map point deletion. Another new data technique is Visual Inertial Odometry ("VIO"), which includes applying inertial constraints to a sparse point map. Still another group of new data techniques is collectively called mapping, which includes inserting new keyrig frames ("keyframes" or "rigframes"), map points and observations. Yet another group of new data techniques is collectively called relocalization, which includes adding new orb features and Bag of Words ("BoW") indices. Another group of new data techniques is collectively called map merge, which includes incorporating sparse map data from a different AR/MR session. Still another group of new data techniques is collectively called joint dense optimization, which includes incorporating dense map data.

Other mapping techniques involve optimization of existing maps. One such group of optimization techniques is collectively called bundle adjustment, which includes modifying sparse map geometry and online calibration. Another group of optimization techniques is collectively called loop closure, which includes modifying sparse map geometry.

Various AR/MR mapping related methods and techniques are described in U.S. Utility patent application Ser. No. 14/705,983 filed on May 7, 2015 and Ser. No. 14/704,844 filed on May 5, 2015, the contents of which are hereby expressly and fully incorporated by reference in their entirety, as though set forth in full.

As described above, mapping facilitates AR/MR system functions. Synchronizing maps across components of multiple component AR/MR systems (e.g., a head-worn display ("wearable") and a belt-worn or body-worn processing component ("power pack")) facilitates a coherent and consistent AR/MR scenario. Map synchronization implicates certain system limitations such as processing power, memory, bandwidth, data sources, latency, and multiple operating systems, processors and architectures.

SUMMARY

In one embodiment, a computer implemented method for updating a point map on a system having first and second communicatively coupled hardware components includes the first component performing a first process on the point map in a first state to generate a first change. The method also includes the second component performing a second process on the point map in the first state to generate a second change. The method further includes the second component applying the second change to the point map in the first state to generate a first updated point map in a second state. Moreover, the method includes the first component sending the first change to the second component. In addition, the method includes the second component applying the first change to the first updated point map in the second state to generate a second updated point map in a third state.

In one or more embodiments, the method also includes the second component sending the second change to the first component. The method further includes the first component applying the second change to the point map in the first state to generate the first updated point map in the second state. Moreover, the method includes the first component applying the first change to the first updated point map in the second state to generate the second updated point map in the third state. The method may also include the first component generating a change order based on the first and second changes, and the first component applying the second change to the point map in the first state before apply the first change to the updated point map in the second state based on the change order. The first component applying the second change to the point map in the first state may include the first component generating a pre-change first state. The first component applying the first change to the first updated point map in the second state may include the first component generating a pre-change second state. The second component applying the second change to the point map in the first state may include the second component generating a pre-change first state, and the second component applying the first change to the first updated point map in the second state may include the second component generating a pre-change second state.

In one or more embodiments, the method also includes the first component generating a change order based on the first and second changes, and the first component sending the change order to the second component. The method may also include the second component applying the second change to the point map in the first state before applying the first change to the updated point map in the second state based on the change order. The first process may be selected from the group consisting of tracking, map point deletion, VIO, mapping, insertion of new keyframe/key rigframe, insertion of new map point, insertion of new observation, bundle adjustment, modification of sparse map geometry, online calibration, relocalization, adding new orb feature; add new BoW index; loop closure; modify sparse map geometry; map merge; and joint dense optimization.

In one or more embodiments, the point map corresponds to a physical location in which the system is located. The physical location may be a room or a cell in a room. The point map may be a portion of a larger point map.

In one or more embodiments, the first component is a head-mounted audio-visual display component of a mixed reality system, and the second component is a torso-mounted processing component of the mixed reality system. The method may also include the second component reconciling the first and second changes before applying the second change to the point map in the first state.

In one or more embodiments, the first and second components are communicatively coupled to a third component. The method also includes the third component performing a third process on the point map in the first state to generate a third change. The method further includes the first and second components sending the first and second changes to the third component, respectively. Moreover, the method includes the third component applying the third change to the second updated point map in the third state to generate a third updated point map in a fourth state. The first component may be a head-mounted audio-visual display component of a mixed reality system, the second component may be a torso-mounted processing component of the mixed reality system, and the third component may be a cloud based processing component. The method may also include the second component receiving the first change from the first component before generating the second change. The second component may include removable media for data storage.

In another embodiment, a mixed reality system includes a head-mounted audio-visual display component, and a torso-mounted processing component communicatively coupled to the display component. The display component is configured to perform a first process on a point map in a first state to generate a first change, and send the first change to the processing component. The processing component is configured to perform a second process on the point map in the first state to generate a second change, apply the second change to the point map in the first state to generate an first updated point map in a second state, and apply the first change to the first updated point map in the second state to generate a second updated point map in a third state.

In one or more embodiments, the processing component is further configured to send the second change to the display component. The display component is also configured to apply the second change to the point map in the first state to generate the first updated point map in the second state and apply the first change to the first updated point map in the second state to generate the second updated point map in the third state. The display component may also be configured to generate a change order based on the first and second changes, and apply the second change to the point map in the first state before apply the first change to the updated point map in the second state based on the change order.

In one or more embodiments, the display component is further configured to generate a change order based on the first and second changes, and send the change order to the processing component. The processing component may also be configured to apply the second change to the point map in the first state before applying the first change to the updated point map in the second state based on the change order. The first process may be selected from the group consisting of tracking, map point deletion, VIO, mapping, insertion of new keyframe/key rigframe, insertion of new map point, insertion of new observation, bundle adjustment, modification of sparse map geometry, online calibration, relocalization, adding new orb feature; add new BoW index; loop closure; modify sparse map geometry; map merge; and joint dense optimization.

In one or more embodiments, the point map corresponds to a physical location in which the system is located. The physical location may be a room or a cell in a room. The point map may be a portion of a larger point map.

In one or more embodiments, the processing component is further configured to reconcile the first and second changes before applying the second change to the point map in the first state. The display and processing components may be communicatively coupled to an online component. The display and processing components may be configured to send the first and second changes to the online component, respectively. The online component may be configured to perform a third process on the point map in the first state to generate a third change, and apply the third change to the second updated point map in the third state to generate a third updated point map in a fourth state.

In one or more embodiments, the display component includes a display component map manager configured to generate a change order, apply changes based on the change order, and send the change order to the processing component. The display component also includes a display component change writer configured to send the first change to the processing component. The display component further includes a display component change reader configured to receive changes. The display component map manager may also be configured to generate a pre-change state. The display component map manager may include a change buffer.

In one or more embodiments, the processing component includes a processing component map manager configured to receive the change order and apply changes based on the change order. The processing component also includes a processing component change writer configured to send the second change to the display component. The processing component further includes a processing component change reader configured to receive changes. The processing component map manager may also be configured to generate a pre-change state. The processing component map manager may include a change buffer. The processing component may include removable media for data storage.

In still another embodiment, a computer implemented method for updating a point map on a system having a head-mounted audio-visual display component, and a torso-mounted processing component communicatively coupled to the display component includes the processing component dividing the point map into a plurality of point map subunits. The method also includes the processing component sending a first subset of the plurality of point map subunits to the display component. The method further includes the processing component sending a second subset of the plurality of point map subunits to the display component in response to movement of the display component.

In one or more embodiments, the method also includes the display component storing the first subset of the plurality of point map subunits, the display component detecting a movement thereof, and the display component sending movement data to the processing component, The method further includes the display component deleting a portion of the first subset of the plurality of point map subunits based on the movement, the display component receiving the second subset of the plurality of point map subunits, and the display component storing the second subset of the plurality of point map subunits. The portion of the first subset of the plurality of point map subunits and the second subset of the plurality of point map subunits may have substantially the same size.

In one or more embodiments, the second subset of the plurality of point map subunits corresponds to a direction of the movement, and the portion of the first subset of the plurality of point map subunits corresponds to a second direction opposite to the direction of the movement. The plurality of point map subunits may be a 3D array. The 3D array may be a 3×3×1 array, a 10×10×1 array, or a 6×6×3 array.

In yet another embodiment, a mixed reality system includes a head-mounted audio-visual display component, and a torso-mounted processing component communicatively coupled to the display component. The processing component is configured to divide a point map into a plurality of point map subunits, send a first subset of the plurality of point map subunits to the display component, and send a second subset of the plurality of point map subunits to the display component in response to movement of the display component. The display component is configured to store the first subset of the plurality of point map subunits, detect a movement thereof, send movement data to the processing component, delete a portion of the first subset of the plurality of point map subunits based on the movement, receive the second subset of the plurality of point map subunits, and storing the second subset of the plurality of point map subunits.

In one or more embodiments, the portion of the first subset of the plurality of point map subunits and the second subset of the plurality of point map subunits have substantially the same size. The second subset of the plurality of point map subunits may corresponds to a direction of the movement, and the portion of the first subset of the plurality of point map subunits may correspond to a second direction opposite to the direction of the movement. The plurality of point map subunits may be a 3D array. The 3D array may be a 3×3×1 array, a 10×10×1 array, or a 6×6×3 array.

In another embodiment, a system for communicating data across a USB cable includes a writer, a reader, and a data structure including an array of cells. Each cell of the array includes an owner indicator, a state indicator, and cell data.

In one or more embodiments, the array of cells includes a plurality of map cells, and at least one transition cell. The system may also include a cell list including a plurality of pointers corresponding to each cell of a map, and a count of the pointers or cells of the map.

In still another embodiment, a method for communicating data across a USB cable using a system including a writer, a reader, and a data structure including an array of cells, each cell of the array including an owner indicator, a state indicator, and cell data, includes initializing the data structure by setting all owner indicators to "owner none" and setting all state indicators to "invalid". The method also includes identifying a cell to be transferred across the USB cable. The method further includes setting the owner indicator of the cell to "comm2". Moreover, the method includes setting the state indicator of the cell to "USB". In addition, the method includes transferring the cell across the USB cable. The method also includes setting the owner indicator of the cell to "map" after transferring the cell across the USB cable. The method further includes setting the state indicator of the cell to "map" after transferring the cell across the USB cable.

In one or more embodiments, the method also includes the system reading a cell list including a plurality of pointers corresponding to each cell having an owner indicator set to "map", and a count of pointers of the plurality or cells having an owner indicator set to "map". The method may also include the writing populating a request array. The method may further include invalidating the cell by setting the owner indicator of the cell to "owner none" and setting the state indicator of the cell to "invalid". Moreover, the method may include sending the cell by setting the owner indicator of the cell to "comm2" and setting the state indicator of the cell to "USB".

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 26 and 27 depict a data structure for zero copy data transfer, according to some embodiments.

DETAILED DESCRIPTION

Figure 1:
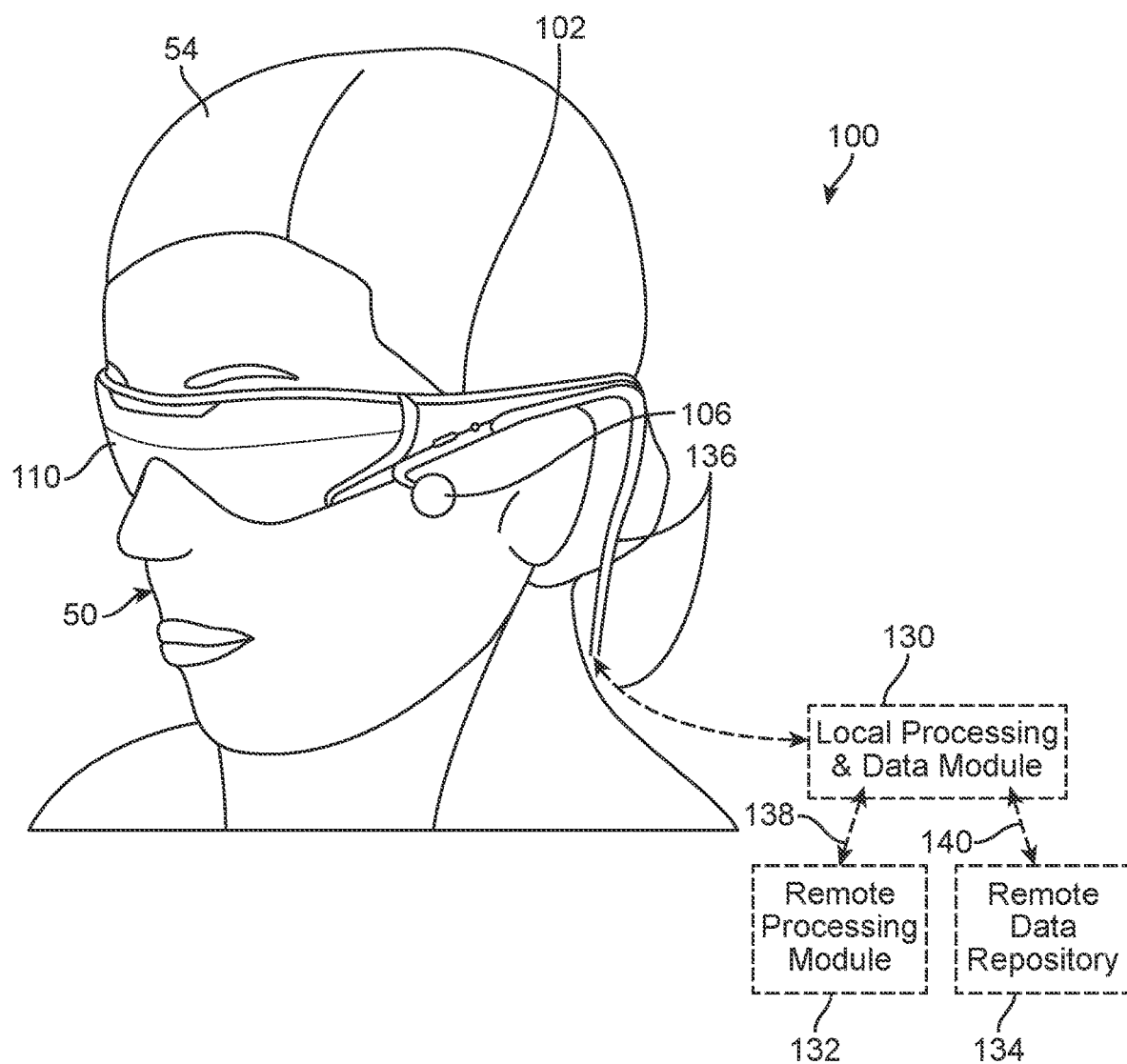
FIGS. 1-4 schematically depict VR/AR/MR systems and subsystems thereof, according to some embodiments.
Figure 2:
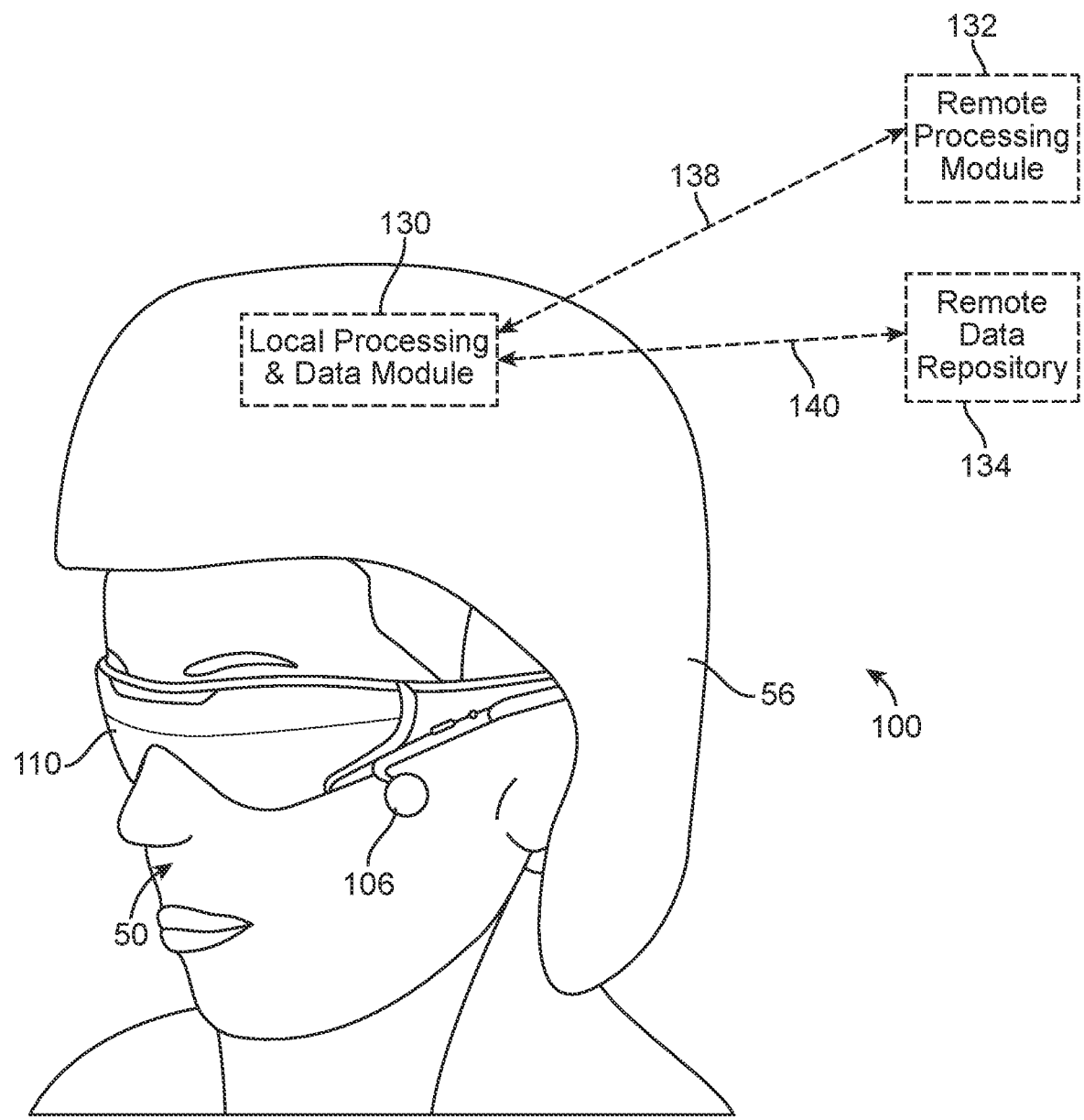
Figure 3:
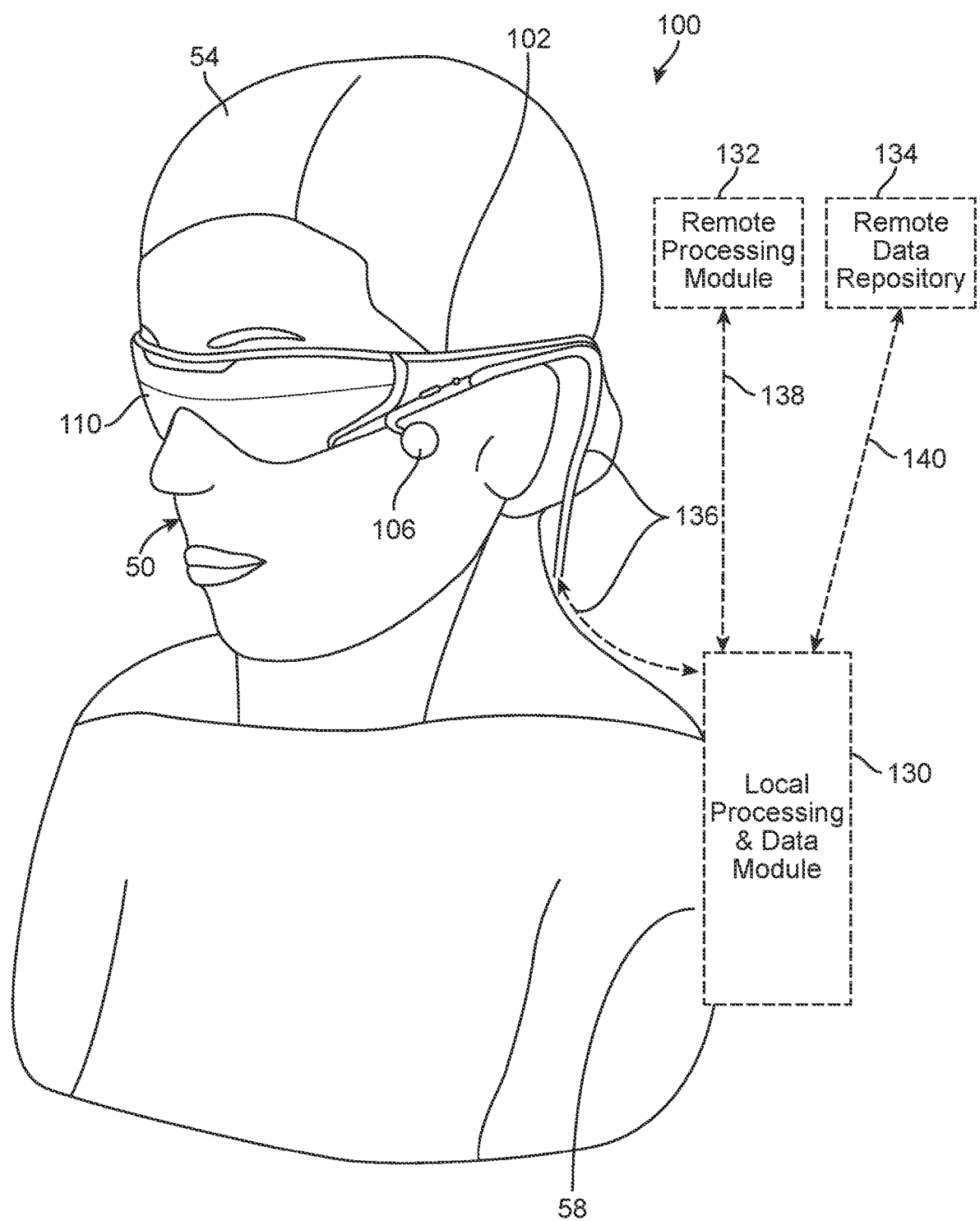

Various embodiments of the disclosure are directed to systems, methods, and articles of manufacture for mapping and map synchronization in multiple component systems in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The head mounted audio-visual display system and user physical contact modulating between systems may be implemented independently of AR/MR systems, but some embodiments below are described in relation to AR/MR systems for illustrative purposes only. The contact modulating systems described herein may also be used in an identical manner with VR systems.

Summary of Problems and Solutions

Mapping is fundamental to many AR/MR system functions, and map synchronization across components of multiple component AR/MR systems facilitates stable mapping for a coherent and consistent AR/MR scenario. System limitations such as processing power, memory, bandwidth, data sources, component latency, and multiple operating systems, processors and architectures can result in overall system latency during mapping, which can negatively impact AR/MR system performance.

For example, in some wearables, tracking consumes a sizable portion of the map data and related processing, and mapping generates most of the map data produced on the wearable. Further, some wearables front facing ("FOV") camera that provide data for mapping. Accordingly, it is preferable to run latency critical jobs and jobs that use FOV camera data on the wearable. However, wearables have limited memory and processing budget/power. For instance, many wearable cannot store the entire sparse point map for a large real world area/space. Also, many wearables cannot run large geometric optimizations (e.g., global bundle adjustment, loop closure, etc.) in a practical amount of time.

Power packs typically have more memory (including some persistent memory, such as SD cards) and processing power than the wearable. Accordingly, power packs have access to more map data (including sparse point map data for large real world areas and dense point map data for limited real world areas) and the processing power to run large geometric optimizations (e.g., global bundle adjustment, loop closure, etc.) Power pack may even have sufficient processing power to run optimizations involving dense point map data. However, map data may travel from the wearable to the power pack through a link (e.g., USB) and updated maps may travel from the power pack to the wearable through the link. Links, such as USB, may have limited bandwidth that results in unacceptable system latency. For instance, it is preferable for latency sensitive jobs (e.g., head pose related jobs) to be performed at the wearable without processing at the power pack.

Some AR/MR systems also include a cloud based storage and processing component. Cloud components may have access to large amounts of persistent storage and processing power. Cloud component may also have access to sparse and dense point maps of the same real world area/environment produced by different systems or the same system at an earlier time. Data from different systems may be stored as a mesh of maps on the cloud allowing for larger scale optimization. Accordingly, cloud components can perform processing intensive optimizations that involve sparse and dense point map date from multiple sessions. However, network connections between cloud components and power packs and wearables are not always available. Accordingly, it is preferable for latency sensitive jobs (e.g., head pose related jobs) to be performed with involvement of cloud components. In some embodiments, a fourth layer of mapping can exists on top of the cloud component layer.

Further, these AR/MR system components involve different platforms, architectures, and organization structures. For instance, these system components (wearable, power pack, cloud) can have different processor architectures, memory hierarchy, and storage models (e.g., Myriad/Streaming Hybrid Architecture Vector Engine ("SHAVE") for wearable, NVidia/ARM for power pack, PC for cloud). The system components can also have different framework environments/operating systems (e.g., minotaur for wearable, malleus for power pack, various OSs for cloud). Further, the system components can have different codebases, release processes, etc. (e.g., in particular between wearable and power pack vs cloud). These component differences can further complicate map synchronization.

The embodiments described herein include a map data processing pipeline that allows parallel processing for all system components by formatting processing results as changes and utilizing change orders. This processing pipeline reduces system latency and allows system components to perform best matched jobs while minimizing system component downtime while waiting for serial processing of map data. The embodiments also include a map data format/structure including independently transferable and manipulable map subunits. This map data format/structure allows the wearable to operate on a subset of the map subunits while the power pack stores the plurality of map subunits defining a sparse point map of a real world area. The embodiments further include a data format/structure for transferring data across a bandwidth limited channel including ownership and state information. This map data format/structure allows more efficient data transfers across such bandwidth limited channels (e.g., USB).

Illustrative VR, AR, and/or MR System

The description that follows pertains to an illustrative VR, AR, and/or MR system with which the contact modulating system may be practiced. However, it is to be understood that the embodiments also lends themselves to applications in other types of display systems (including other types of VR, AR, and/or MR systems), and therefore the embodiments are not to be limited to only the illustrative system disclosed herein.

Various components of VR, AR, and/or MR virtual image systems 100 are depicted in FIGS. 1 to 4. The virtual image generation system 100 comprises a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
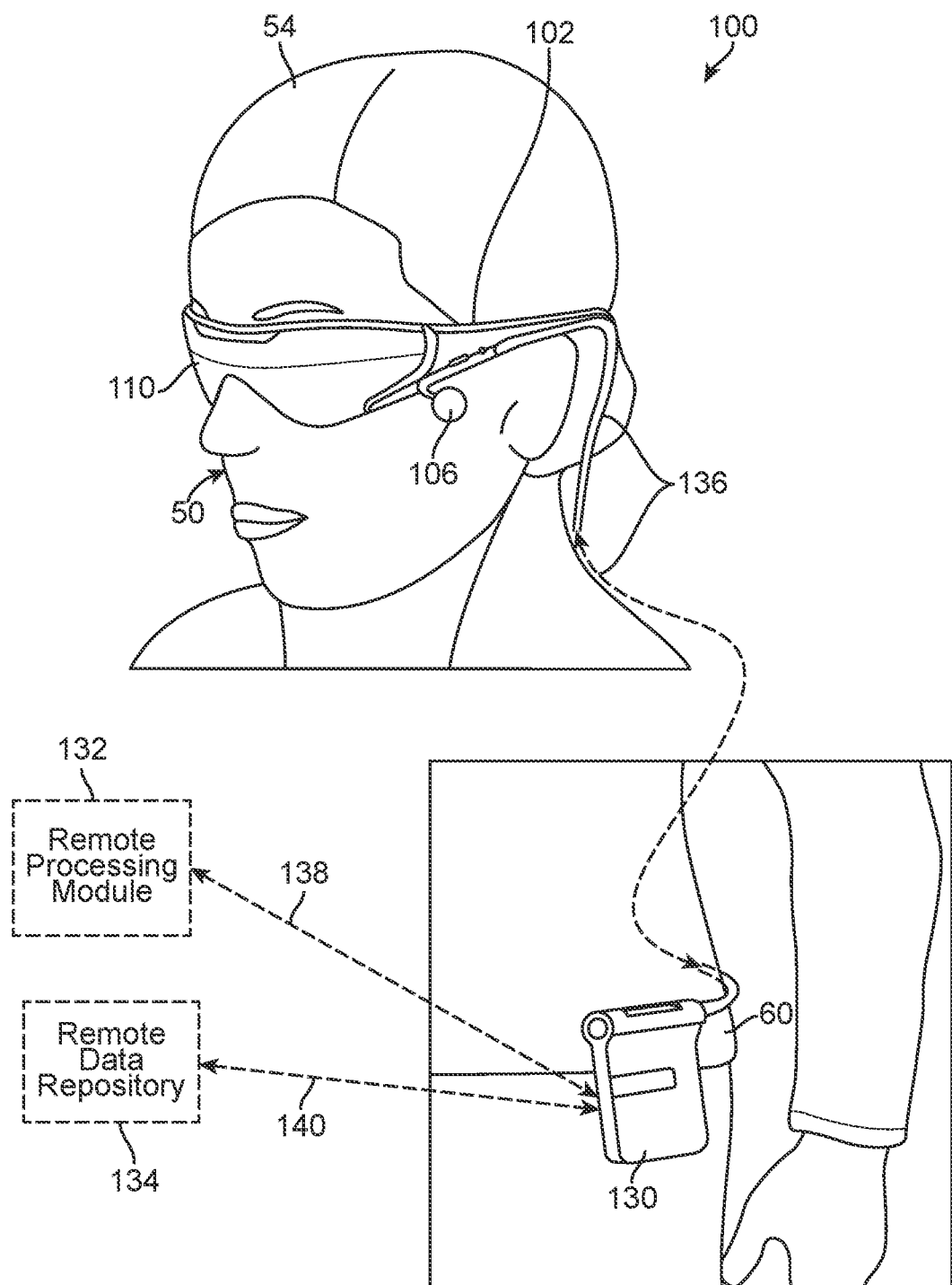

The various processing components of the virtual image generation system 100 may be physically contained in a distributed subsystem. For example, as illustrated in FIGS. 1 to 4, the virtual image generation system 100 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The virtual image generation system 100 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1 to 4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane.

The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the VR, AR, and/or MR system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
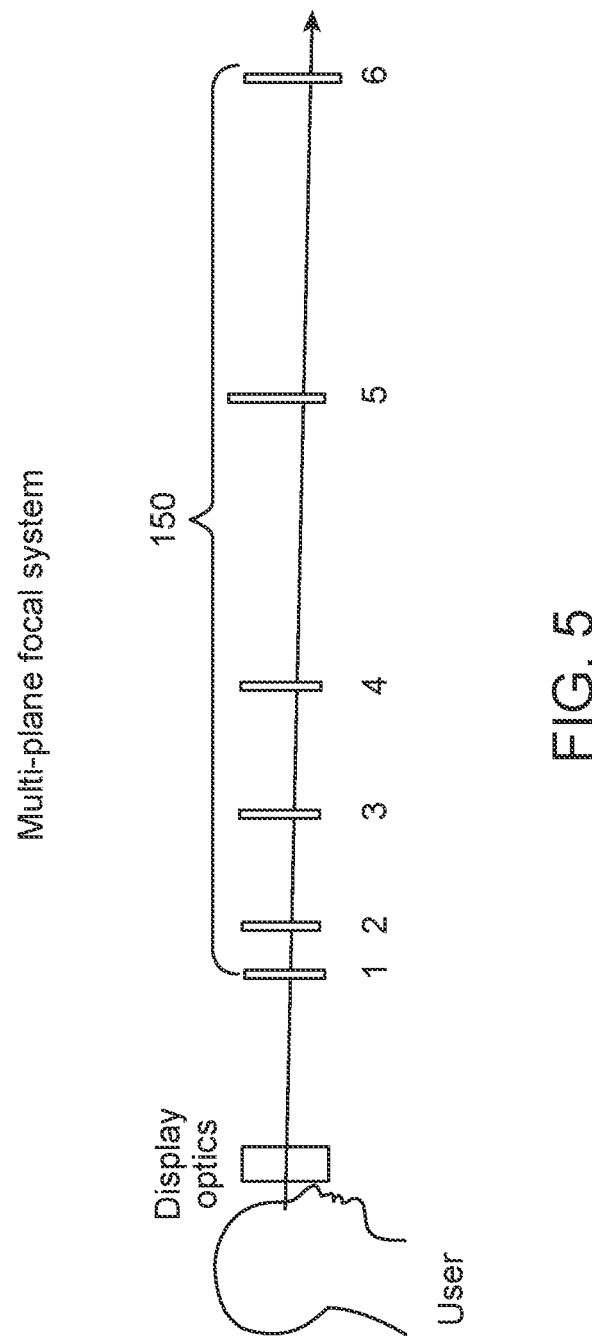
FIG. 5 depicts the focal planes of a VR/AR/MR system, according to some embodiments.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the VR, AR, and/or MR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

VR, AR, and/or MR systems may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Exemplary Passable World Models

Figure 6:
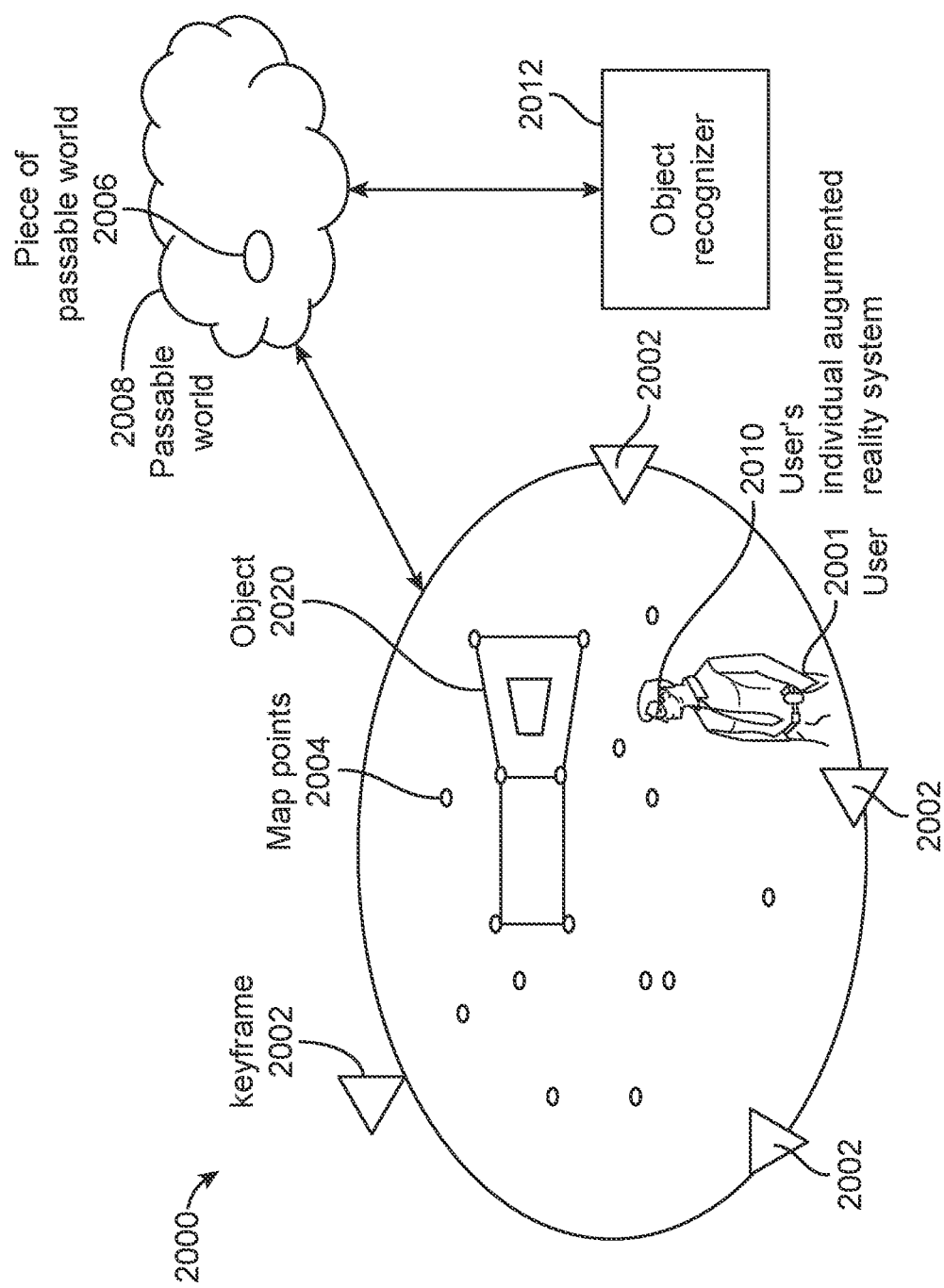
FIG. 6 depicts a simplified view of a passable world model, according to some embodiments.
Figure 7:
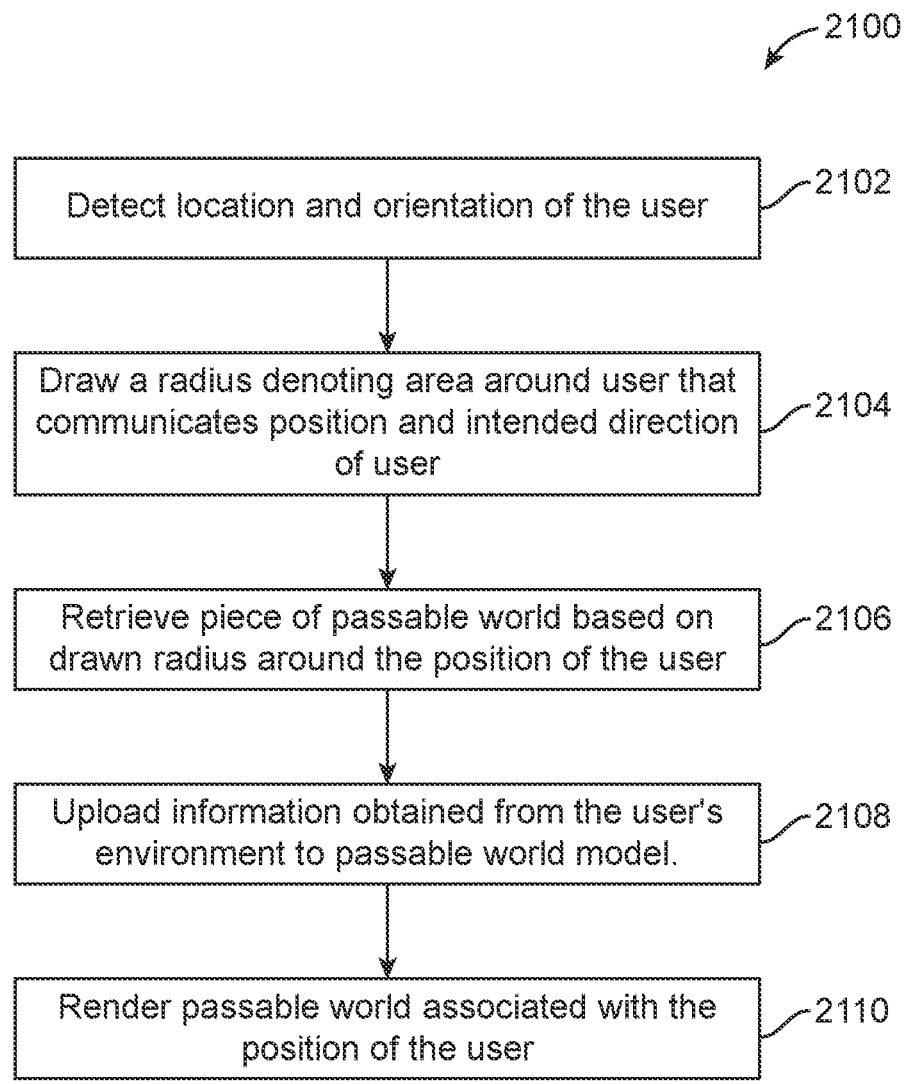
FIG. 7 depicts a method of rendering using a passable world model, according to some embodiments.

FIG. 6 illustrates the components of a passable world model 2000 according to some embodiments. As a user 2001 walks through an environment, the user's individual AR system 2010 captures information (e.g., images, location information, position and orientation information, etc.) and saves the information through posed tagged images. In the illustrated embodiment, an image may be taken of the object 2020 (which resembles a table) and map points 2004 may be collected based on the captured image. This forms the core of the passable world model, as shown by multiple keyframes (e.g., cameras) 2002 that have captured information about the environment.

As shown in FIG. 6, there may be multiple keyframes 2002 that capture information about a space at any given point in time. For example, a keyframe may be another user's AR system capturing information from a particular point of view. Another keyframe may be a room-based camera/sensor system that is capturing images and points 2004 through a stationary point of view. By triangulating images and points from multiple points of view, the position and orientation of real objects in a 3D space may be determined.

In some embodiments, the passable world model 2008 is a combination of raster imagery, point and descriptors clouds, and polygonal/geometric definitions (referred to herein as parametric geometry). All this information is uploaded to and retrieved from the cloud, a section of which corresponds to a particular space that the user may have walked into. As shown in FIG. 6, the passable world model also contains many object recognizers 2012 that work on the cloud or on the user's individual system 2010 to recognize objects in the environment based on points and pose-tagged images captured through the various keyframes of multiple users. Essentially by continually capturing information about the physical world through multiple keyframes 2002, the passable world is always growing, and may be consulted (continuously or as needed) in order to determine how to render virtual content in relation to existing physical objects of the real world. By collecting information from the user's environment, a piece of the passable world 2006 is constructed/augmented, and may be "passed" along to one or more AR users simultaneously or in the future.

Asynchronous communications is established between the user's respective individual AR system and the cloud based computers (e.g., server computers). In other words, the user's individual AR system is constantly updating information about the user's surroundings to the cloud, and also receiving information from the cloud about the passable world. Thus, rather than each AR user having to capture images and recognize objects based on the captured images, having an asynchronous system allows the system to be more efficient. Information that already exists about that part of the world is automatically communicated to the individual AR system while new information is updated to the cloud. It should be appreciated that the passable world model lives both on the cloud or other form of networking computing or peer to peer system, and also may live on the user's individual AR system.

In some embodiments, the AR system may employ different levels of resolutions for the local components (e.g., computational component 130 such as a power pack) and remote components (e.g., cloud based computers 132). This is because the remote components (e.g., resources that reside on the cloud servers) are typically more computationally powerful than local components. The cloud based computers may pick data collected by the many different individual AR systems, and/or one or more space or room based sensor systems, and utilize this information to add on to the passable world model. The cloud based computers may aggregate only the best (e.g., most useful) information into a persistent world model. In other words, redundant information and/or less-than-optimal quality information may be timely disposed so as not to deteriorate the quality and/or performance of the system.

Figure 10:
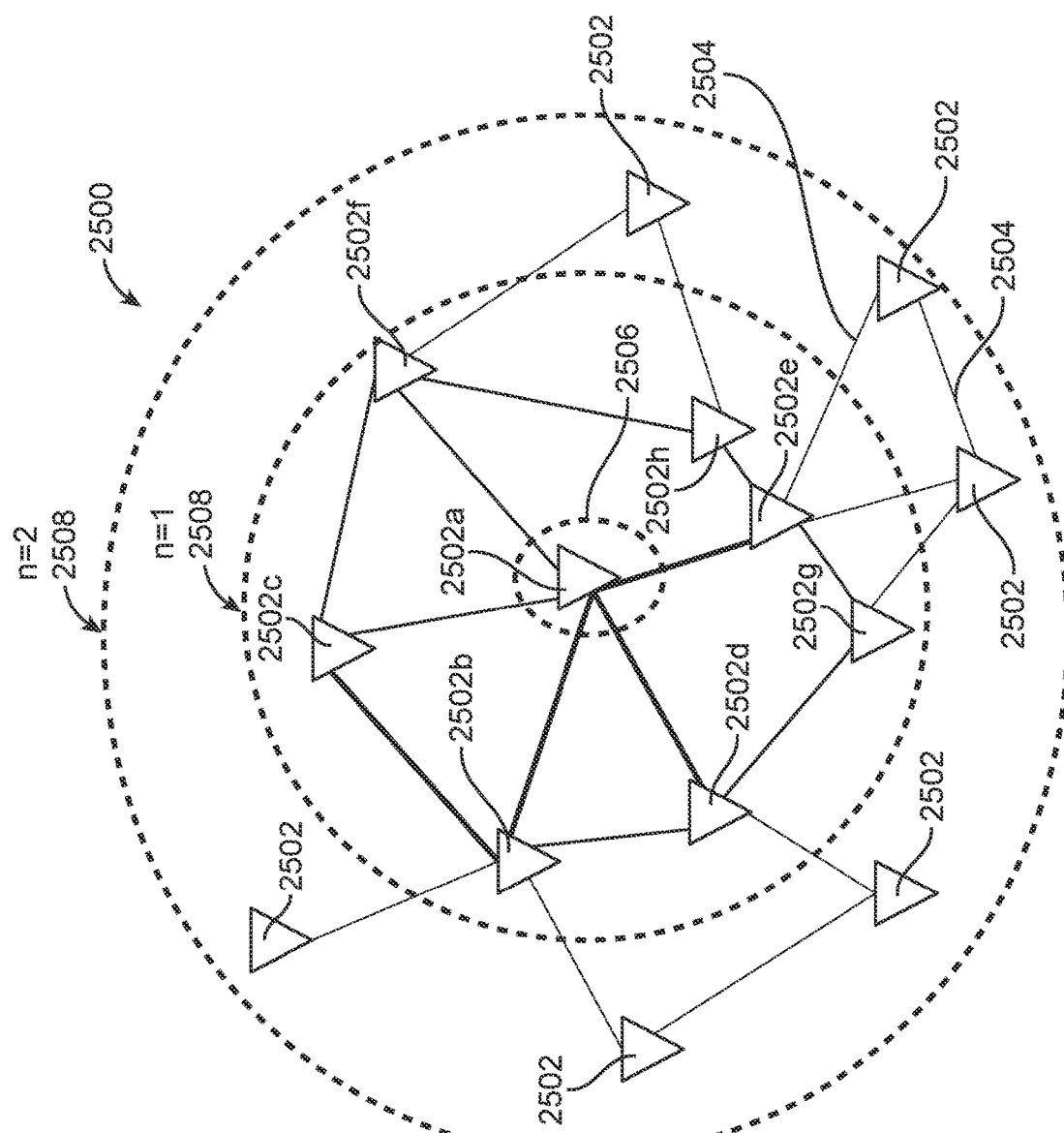
FIG. 10 depicts a geometric map as a connection between various keyframes, according to some embodiments.

FIG. 10 illustrates an example method 2100 of interacting with the passable world model according to some embodiments. At 2102, the user's individual AR system may detect a location and orientation of the user within the world. In some embodiments, the location may be derived by a topological map of the system, as will be described in further detail below. In some embodiments, the location may be derived by GPS or any other localization tool. It should be appreciated that the passable world may be constantly accessed by the individual AR system.

In another embodiment (not shown), the user may request access to another user's space, prompting the system to access that section of the passable world, and associated parametric information corresponding to the other user. Thus, there may be many triggers for the passable world. At the simplest level, however, it should be appreciated that the passable world is constantly being updated and accessed by multiple user systems, thereby constantly adding and receiving information from the cloud.

Following the above example, based on the known location of the user, at 2104, the system may draw a radius denoting a physical area around the user that communicates both the position and intended direction of the user. Next, at 2106, the system may retrieve a piece of the passable world based on the anticipated position of the user. In some embodiments, the piece of the passable world may contain information from the geometric map of the space acquired through previous keyframes and captured images and data stored in the cloud. At 2108, the AR system uploads information from the user's environment into the passable world model. At 2110, based on the uploaded information, the AR system renders the passable world associated with the position of the user to the user's individual AR system.

This information enables virtual content to meaningfully interact with the user's real surroundings in a coherent manner. For example, a virtual "monster" may be rendered to be originating from a particular building of the real world. Or, in another example, a user may leave a virtual object in relation to physical coordinates of the real world such that a friend (also wearing the AR system) finds the virtual object in the same physical coordinates. In order to enable such capabilities (and many more), it is important for the AR system to constantly access the passable world to retrieve and upload information. It should be appreciated that the passable world contains persistent digital representations of real spaces that is crucially utilized in rendering virtual and/or digital content in relation to real coordinates of a physical space. It should be appreciated that the AR system may maintain coordinates of the real world and/or virtual world. In some embodiments, a third party may maintain the map (e.g., coordinates) of the real world, and the AR system may consult the map to determine one or more parameters in order to render virtual content in relation to real objects of the world.

It should be appreciated that the passable world model does not itself render content that is displayed to the user. Rather it is a high level concept of dynamically retrieving and updating a persistent digital representation of the real world in the cloud. In some embodiments, the derived geometric information is loaded onto a game engine, which then renders content associated with the passable world. Thus, regardless of whether the user is in a particular space or not, that particular space has a digital representation in the cloud that can be accessed by any user. This piece of the passable world may contain information about the physical geometry of the space and imagery of the space, information about various avatars that are occupying the space, information about virtual objects and other miscellaneous information.

As described in detail further herein, one or more object recognizers may examine or "crawl" the passable world models, tagging points that belong to parametric geometry. Parametric geometry, points and descriptors may be packaged into passable world models, to allow low latency passing or communicating of information corresponding to a portion of a physical world or environment. In some embodiments, the AR system can implement a two tier structure, in which the passable world model allow fast pose processing in a first tier, but then inside that framework is a second tier (e.g., FAST features). In some embodiments, the second tier structure can increase resolution by performing a frame-to-frame based three-dimensional (3D) feature mapping.

Topological Maps

An integral part of the passable world model is to create maps of very minute areas of the real world. For example, in order to render virtual content in relation to physical objects, very detailed localization is required. Such localization may not be achieved simply through GPS or traditional location detection techniques. For example, the AR system may not only require coordinates of a physical location that a user is in, but may, for example, need to know exactly what room of a building the user is located in. Based on this information, the AR system may retrieve data (e.g., specific geometries of real objects in the room, map points for the room, geometric information of the room, etc.) for that room to appropriately display virtual content in relation to the real objects of the identified room. At the same time, however, this precise, granular localization must be done in a cost-effective manner such that not too many resources are consumed unnecessarily.

To this end, the AR system may use topological maps for localization purposes instead of GPS or retrieving detailed geometric maps created from extracted points and pose tagged images (e.g., the geometric points may be too specific, and hence most costly). In some embodiments, the topological map is a simplified representation of physical spaces in the real world that is easily accessible from the cloud and only presents a fingerprint of a space, and the relationship between various spaces. Further details about the topological map will be provided further below.

In some embodiments, the AR system may layer topological maps on the passable world model, for example to localize nodes. The topological map can layer various types of information on the passable world model, for instance: point cloud, images, objects in space, global positioning system (GPS) data, Wi-Fi data, histograms (e.g., color histograms of a room), received signal strength (RSS) data, etc. This allows various layers of information (e.g., a more detailed layer of information to interact with a more high-level layer) to be placed in context with each other, such that it can be easily retrieved. This information may be thought of as fingerprint data; in other words, it is designed to be specific enough to be unique to a location (e.g., a particular room).

As discussed above, in order to create a complete virtual world that can be reliably passed between various users, the AR system captures different types of information about the user's surroundings (e.g., map points, features, pose tagged images, objects in a scene, etc.). This information is processed and stored in the cloud such that it can be retrieved as needed. As mentioned previously, the passable world model is a combination of raster imagery, point and descriptors clouds, and polygonal/geometric definitions (referred to herein as parametric geometry). Thus, it should be appreciated that the sheer amount of information captured through the users' individual AR system allows for high quality and accuracy in creating the virtual world.

In other words, since the various AR systems (e.g., user-specific head-mounted systems, room-based sensor systems, etc.) are constantly capturing data corresponding to the immediate environment of the respective AR system, very detailed and accurate information about the real world in any point in time may be known with a high degree of certainty. Although this amount of information is highly useful for a host of AR applications, for localization purposes, sorting through that much information to find the piece of passable world most relevant to the user is highly inefficient and costs precious bandwidth.

To this end, the AR system creates a topological map that essentially provides less granular information about a particular scene or a particular place. In some embodiments, the topological map may be derived through global positioning system (GPS) data, Wi-Fi data, histograms (e.g., color histograms of a room), received signal strength (RSS) data, etc. For example, the topological map may be created by histograms (e.g., a color histogram) of various rooms/areas/spaces, and be reduced to a node on the topological map. For example, when a user walks into a room or space, the AR system may take a single image (or other information) and construct a color histogram of the image. It should be appreciated that on some level, the histogram of a particular space will be mostly constant over time (e.g., the color of the walls, the color of objects of the room, etc.). In other words, each room or space has a distinct signature that is different from any other room or place. This unique histogram may be compared to other histograms of other spaces/areas and identified. Now that the AR system knows what room the user is in, the remaining granular information may be easily accessed and downloaded.

Thus, although the histogram will not contain particular information about all the features and points that have been captured by various cameras (keyframes), the system may immediately detect, based on the histogram, where the user is, and then retrieve all the more particular geometric information associated with that particular room or place. In other words, rather than sorting through the vast amount of geometric and parametric information that encompasses that passable world model, the topological map allows for a quick and efficient way to localize the AR user. Based on the localization, the AR system retrieves the keyframes and points that are most relevant to the identified location. For example, after the system has determined that the user is in a conference room of a building, the system may then retrieve all the keyframes and points associated with the conference room rather than searching through all the geometric information stored in the cloud.

Figure 8:
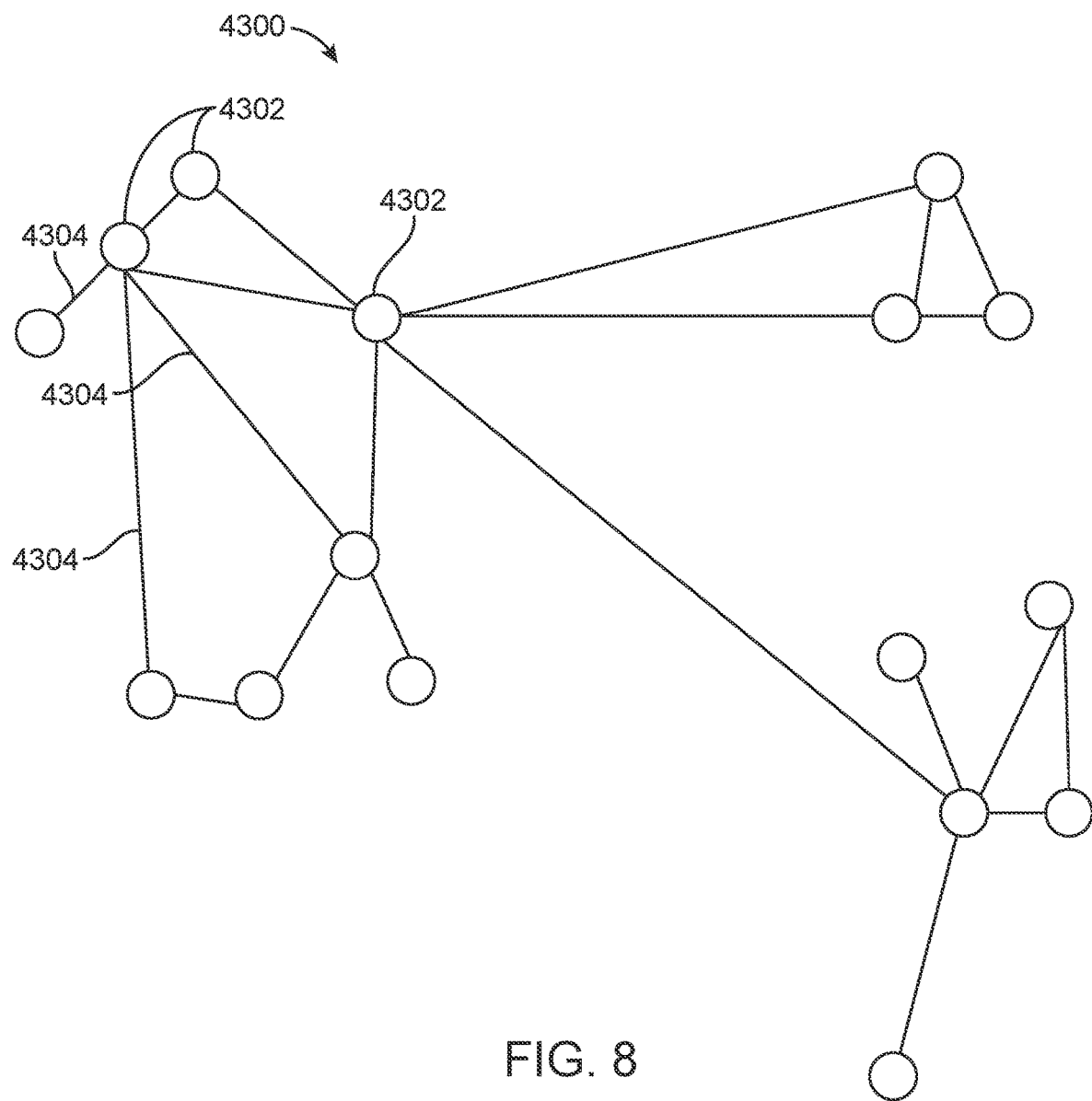
FIG. 8 depicts a topological map according to some embodiments.

Referring now to FIG. 8, an example embodiment of a topological map 4300 is presented. As discussed above, the topological map 4300 may be a collection of nodes 4302 and connections 4304 between the nodes 4302 (e.g., represented by connecting lines). Each node 4302 represents a particular location (e.g., the conference room of an office building) having a distinct signature or fingerprint (e.g., GPS information, color histogram or other histogram, Wi-Fi data, RSS data etc.) and the lines may represent the connectivity between them. It should be appreciated that the connectivity may not have anything to do with geographical connectivity, but rather may simply be a shared device or a shared user. For example, a first user may have walked from a first node to a second node. This relationship may be represented through a connection between the nodes. As the number of AR users increases, the nodes and connections between the nodes will also proportionally increase, providing more precise information about various locations.

Once the AR system has identified a node of the topological map, the system may then retrieve a set of geometric information pertaining to the node to determine how/where to display virtual content in relation to the real objects of that space. Thus, layering the topological map on the geometric map is especially helpful for localization and efficiently retrieving only relevant information from the cloud.

In some embodiments, the AR system can represent two images captured by respective cameras of a part of the same scene in a graph theoretic context as first and second pose tagged images. It should be appreciated that the cameras in this context may refer to a single camera taking images of different scenes, or it may be two different cameras. There is some strength of connection between the pose tagged images, which could, for example, be the points that are in the field of views of both of the cameras. In some embodiments, the cloud based computer may construct such as a graph (e.g., a topological representation of a geometric world similar to that of FIG. 8). The total number of nodes and edges in the graph is much smaller than the total number of points in the images.

At a higher level of abstraction, other information monitored by the AR system can be hashed together. For example, the cloud based computer(s) may hash together one or more of global positioning system (GPS) location information, Wi-Fi location information (e.g., signal strengths), color histograms of a physical space, and/or information about physical objects around a user. The more points of data there are, the more likely that the computer will statistically have a unique identifier for that space. In this case, space is a statistically defined concept.

As an example, an office may be a space that is represented as, for example a large number of points and two dozen pose tagged images. The same space may be represented topologically as a graph having only a certain number of nodes (e.g., 5, 25, 100, 1000, etc.), which can be easily hashed against. Graph theory allows representation of connectedness, for example as a shortest path algorithmically between two spaces.

Thus, the system abstracts away from the specific geometry by turning the geometry into pose tagged images having implicit topology. The system takes the abstraction a level higher by adding other pieces of information, for example color histogram profiles, and the Wi-Fi signal strengths. This makes it easier for the system to identify an actual real world location of a user without having to understand or process all of the geometry associated with the location.

Figure 9:
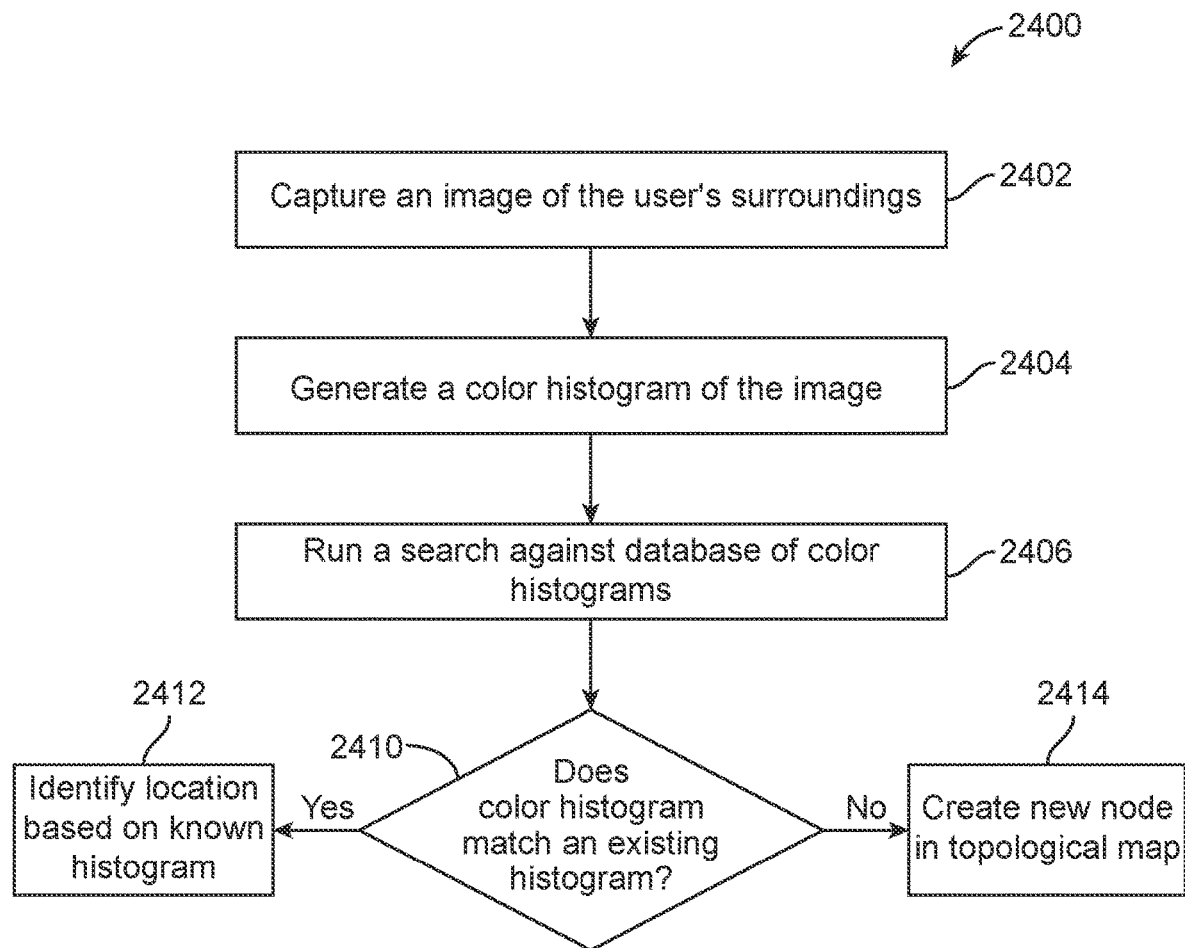
FIG. 9 depicts a high level flow diagram for a process of localization using a topological map, according to some embodiments.

FIG. 9 illustrates an example method 2400 of constructing a topological map. First, at 2402, the user's individual AR system may capture an image from a first point of view of a particular location (e.g., the user walks into a room of a building, and an image is captured from that point of view). At 2404, a color histogram may be generated based on the captured image. As mentioned before, the system may use any other type of identifying information, (e.g., Wi-Fi data, RSS information, GPS data, number of windows, etc.) but the color histogram is used in this example for illustrative purposes.

Next, at 2406, the system runs a search to identify the location of the user by comparing the color histogram to a database of color histograms stored in the cloud. At 2410, a decision is made to determine whether the color histogram matches an existing color histogram stored in the cloud. If the color histogram does not match any color histogram of the database of color histograms, it may then be stored as a node in the topological made (2414). If the color histogram matches an existing color histogram of the database, it is stored as a node in the cloud (2412). If the color histogram matches an existing color histogram in the database, the location is identified, and the appropriate geometric information is provided to the individual AR system.

Continuing with the same example, the user may walk into another room or another location, where the user's individual AR system takes another picture and generates another color histogram of the other location. If the color histogram is the same as the previous color histogram or any other color histogram, the AR system identifies the location of the user. If the color histogram is not the same as a stored histogram, another node is created on the topological map. Additionally, since the first node and second node were taken by the same user (or same camera/same individual user system), the two nodes are connected in the topological map.

In addition to aiding in localization, the topological map may also be used to improve/fix errors and or missing information in geometric maps. In some embodiments, topological maps may be used to find loop-closure stresses in geometric maps or geometric configurations of a particular place. As discussed above, for any given location or space, images taken by one or more AR systems (multiple field of view images captured by one user's individual AR system or multiple users' AR systems) give rise a large number of map points of the particular space. For example, a single room may correspond to thousands of map points captured through multiple points of views of various cameras (or one camera moving to various positions).

The AR system utilizes map points to recognize objects (through object recognizers) as discussed above, and to add to on to the passable world model in order to store a more comprehensive picture of the geometry of various objects of the real world. In some embodiments, map points derived from various keyframes may be used to triangulate the pose and orientation of the camera that captured the images. In other words, the collected map points may be used to estimate the pose (e.g., position and orientation) of the keyframe (e.g. camera) capturing the image.

It should be appreciated, however, that given the large number of map points and keyframes, there are bound to be some errors (e.g., stresses) in this calculation of keyframe position based on the map points. To account for these stresses, the AR system may perform a bundle adjust. A bundle adjust allows for the refinement, or optimization of the map points and keyframes to minimize the stresses in the geometric map.

For example, as illustrated in FIG. 10, an example geometric map is presented. As shown in FIG. 10, the geometric map may be a collection of keyframes 2502 that are all connected to each other. The keyframes 2502 may represent a point of view from which various map points are derived for the geometric map. In the illustrated embodiment, each node of the geometric map represents a keyframe (e.g., camera), and the various keyframes are connected to each other through connecting lines 2504.

In the illustrated embodiment, the strength of the connection between the different keyframes is represented by the thickness of the connecting lines 2504. For example, as shown in FIG. 10, the connecting line between node 2502*a* and 2502*b* is depicted as a thicker connecting line 2504 as compared to the connecting line between node 2502*a* and node 2502*f*. The connecting line between node 2502*a* and node 2502*d* is also depicted to be thickener than the connecting line between 2502*b* and node 2502*d*. In some embodiments, the thickness of the connecting lines represents the number of features or map points shared between them. For example, if a first keyframe and a second keyframe are close together, they may share a large number of map points (e.g., node 2502*a* and node 2502*b*), and may thus be represented with a thicker connecting line. Of course, it should be appreciated that other ways of representing geometric maps may be similarly used.

For example, the strength of the line may be based on a geographical proximity between the keyframes, in another embodiment. Thus, as shown in FIG. 10, each geometric map represents a large number of keyframes 2502 and their connection to each other. Now, assuming that a stress is identified in a particular point of the geometric map, a bundle adjust may be performed to alleviate the stress by radially pushing the stress out radially out from the identified point of stress 2506. The stress is pushed out radially in waves 2508 (e.g., n=1, n=2, etc.) propagating from the point of stress, as will be described in further detail below.

The following description illustrates an example method of performing a wave propagation bundle adjust. It should be appreciated that all the examples below refer solely to wave propagation bundle adjusts, and other types of bundle adjusts may be similarly used in other embodiments. First, a particular point of stress is identified. In the illustrated embodiment of FIG. 10, consider the center (node 2502a) to be the identified point of stress. For example, the system may determine that the stress at a particular point of the geometric map is especially high (e.g., residual errors, etc.) The stress may be identified based on one of two reasons. One, a maximum residual error may be defined for the geometric map. If a residual error at a particular point is greater than the predefined maximum residual error, a bundle adjust may be initiated. Second, a bundle adjust may be initiated in the case of loop closure stresses, as will be described further below (when a topological map indicates misalignments of map points).

When a stress is identified, the AR system distributes the error evenly, starting with the point of stress and propagating it radially through a network of nodes that surround the particular point of stress. For example, in the illustrated embodiment, the bundle adjust may distribute the error to n=1 (one degree of separation from the identified point of stress, node 2502a) around the identified point of stress. In the illustrated embodiment, nodes 2502b-2502g are all part of the n=1 wave around the point of stress, node 2502a.

In some cases, this may be sufficient. In other embodiments, the AR system may propagate the stress even further, and push out the stress to n=2 (two degrees of separation from the identified point of stress, node 2502a), or n=3 (three degrees of separation from the identified point of stress, node 2502a) such that the stress is radially pushed out further and further until the stress is distributed evenly. Thus, performing the bundle adjust is an important way of reducing stress in the geometric maps. Ideally, the stress is pushed out to n=2 or n=3 for better results.

In some embodiments, the waves may be propagated in even smaller increments. For example, after the wave has been pushed out to n=2 around the point of stress, a bundle adjust can be performed in the area between n=3 and n=2, and propagated radially. By controlling the wave increments, this iterative wave propagating bundle adjust process can be run on massive data to reduce stresses on the system. In an optional embodiment, because each wave is unique, the nodes that have been touched by the wave (e.g., bundle adjusted) may be colored so that the wave does not re-propagate on an adjusted section of the geometric map. In another embodiment, nodes may be colored so that simultaneous waves may propagate/originate from different points in the geometric map.

As mentioned previously, layering the topological map on the geometric map of keyframes and map points may be especially crucial in finding loop-closure stresses. A loop-closure stress refers to discrepancies between map points captured at different times that should be aligned but are misaligned. For example, if a user walks around the block and returns to the same place, map points derived from the position of the first keyframe and the map points derived from the position of the last keyframe as extrapolated from the collected map points should ideally be identical. However, given stresses inherent in the calculation of pose (position of keyframes) based on the different map points, there are often errors and the system does not recognize that the user has come back to the same position because estimated key points from the first key frame are not geometrically aligned with map points derived from the last keyframe. This may be an example of a loop-closure stress.

Figure 11:
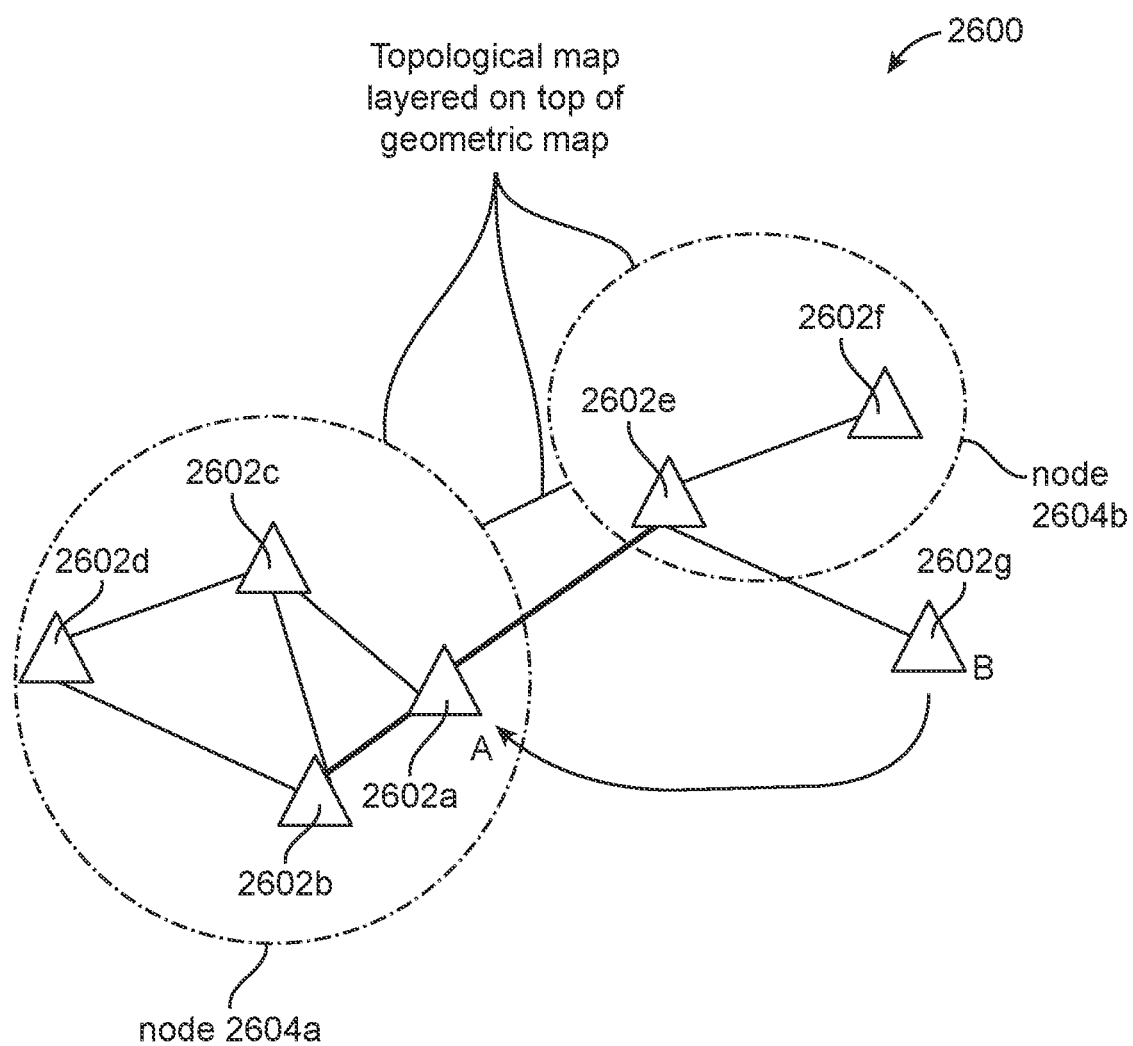
FIG. 11 depicts a topological map layered on top of a geometric map, according some embodiments.

To this end, the topological map may be used to find the loop-closure stresses in a geometric map. Referring back to the previous example, using the topological map along with the geometric map allows the AR system to recognize the loop-closure stresses in the geometric map because the topological map may indicate that the user has come back to the starting point (based on the color histogram, for example). For example, referring to the layered map 2600 of FIG. 11, the nodes of the topological map (e.g., 2604a and 2604b) are layered on top of the nodes of the geometric map (e.g., 2602a-2602f). As shown in FIG. 11, the topological map, when placed on top of the geometric map may suggest that keyframe B (node 2602g) is the same as keyframe A (node 2602a). Based on this, a loop closure stress may be detected, the system detects that keyframes A and B should be closer together in the same node, and the system may then perform a bundle adjust. Thus, having identified the loop-closure stress, the AR system may then perform a bundle adjust on the identified point of stress, using a bundle adjust technique, such as the one discussed above.

It should be appreciated that performing the bundle adjust based on the layering of the topological map and the geometric map ensures that the system only retrieves the keyframes on which the bundle adjust needs to be performed instead of retrieving all the keyframes in the system. For example, if the AR system identifies, based on the topological map that there is a loop-closure stress, the system may simply retrieve the keyframes associated with that particular node or nodes of the topological map, and perform the bundle adjust on only those keyframes rather than all the keyframes of the geometric map. Again, this enables the system to be efficient and not retrieve unnecessary information that might unnecessarily tax the system.

Figure 12:
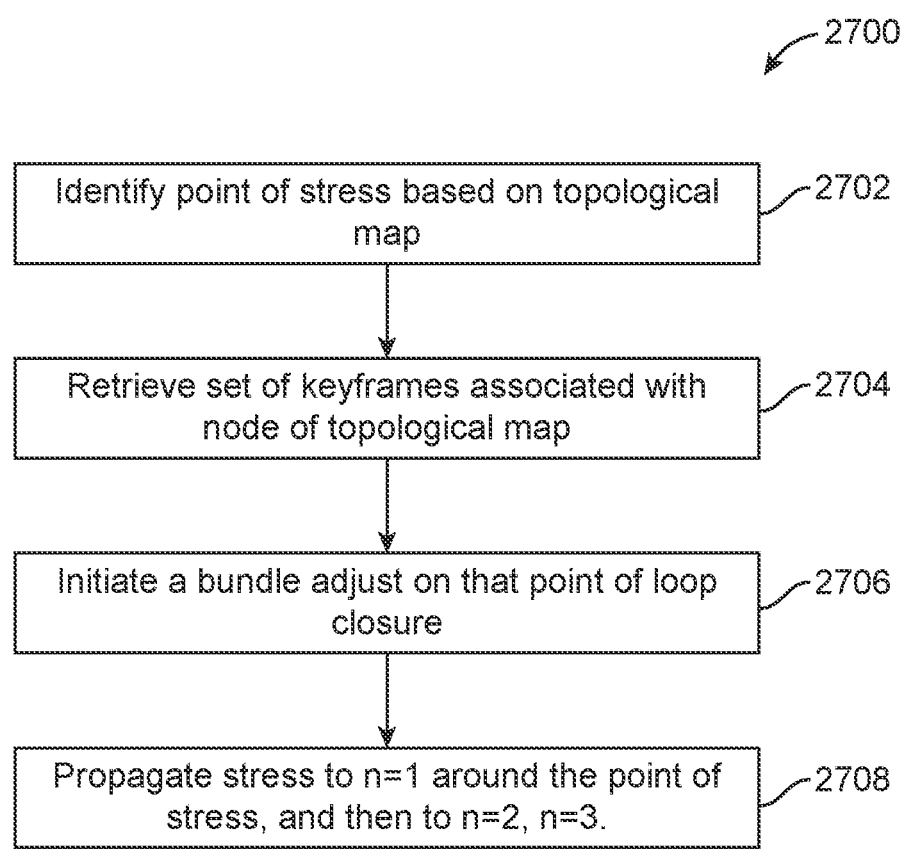
FIG. 12 depicts a high level flow diagram for a process of performing a wave propagation bundle adjustment, according to some embodiments.

Referring now to FIG. 12, an example method 2700 for correcting loop-closure stresses based on the topological map is described. At 2702, the system may identify a loop closure stress based on a topological map that is layered on top of a geometric map. Once the loop closure stress has been identified, at 2704, the system may retrieve the set of keyframes associated with the node of the topological map at which the loop closure stress has occurred. After having retrieved the keyframes of that node of the topological map, the system may, at 2706, initiate a bundle adjust on that point in the geometric map. At 2708, the stress is propagated away from the identified point of stress and is radially distributed in waves, to n=1 (and then n=2, n=3, etc.) similar to the technique shown in FIG. 10.

Mapping

In mapping out the virtual world, it is important to know all the features and points in the real world to accurately portray virtual objects in relation to the real world. To this end, as discussed above, map points captured from various head-worn AR systems are constantly adding to the passable world model by adding in new pictures that convey information about various points and features of the real world. Based on the points and features, as discussed above, one can also extrapolate the pose and position of the keyframe (e.g., camera, etc.). While this allows the AR system to collect a set of features (2D points) and map points (3D points), it may also be important to find new features and map points to render a more accurate version of the passable world.

One way of finding new map points and/or features may be to compare features of one image against another. Each feature may have a label or feature descriptor attached to it (e.g., color, identifier, etc.). Comparing the labels of features in one picture to another picture may be one way of uniquely identifying natural features in the environment. For example, if there are two keyframes, each of which captures about 500 features, comparing the features of one keyframe with the other may help determine new map points. However, while this might be a feasible solution when there are just two keyframes, it becomes a very large search problem that takes up a lot of processing power when there are multiple keyframes, each of which captures millions of points. In other words, if there are M keyframes, each having N unmatched features, searching for new features involves an operation of MN2 (O(MN2)). Unfortunately, this is a very large search operation.

Figure 13:
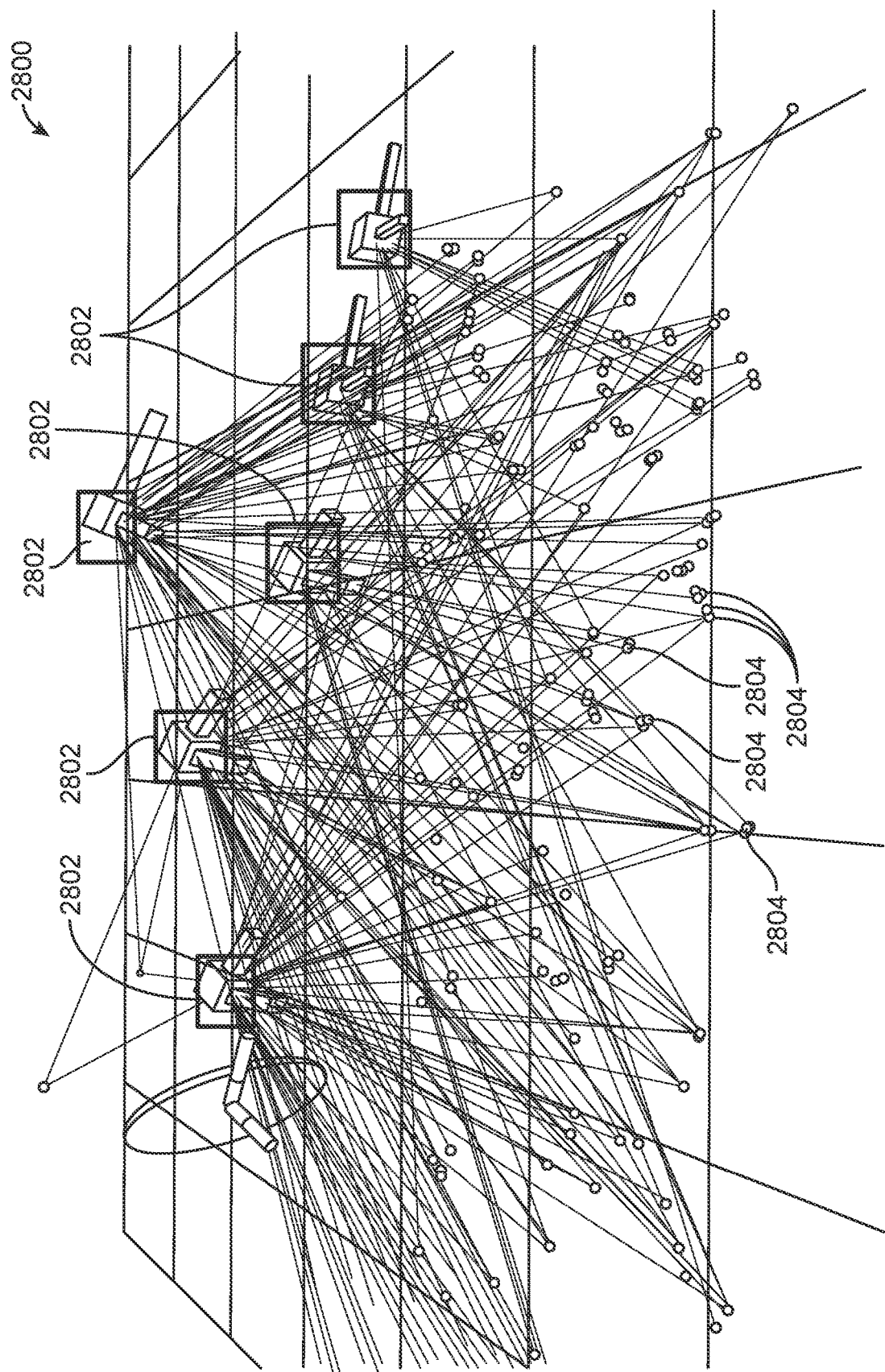
FIG. 13 depicts map points, keyframes, and render lines from the map points to the keyframes as seen through a virtual keyframe, according to some embodiments.

One approach to find new points that avoids such a large search operation is by render rather than search. In other words, assuming the position of M keyframes are known and each of them has N points, the AR system may project lines (or cones) from N features to the M keyframes to triangulate a 3D position of the various 2D points. Referring now to FIG. 13, in this particular example, there are 6 keyframes 2802, and lines or rays are rendered (using a graphics card) from the 6 keyframes to the points 2804 derived from the respective keyframe. In some embodiments, new 3D map points may be determined based on the intersection of the rendered lines. In other words, when two rendered lines intersect, the pixel coordinates of that particular map point in a 3D space may be 2 instead of 1 or 0. Thus, the higher the intersection of the lines at a particular point, the higher the likelihood is that there is a map point corresponding to a particular feature in the 3D space. In some embodiments, this intersection approach, as shown in FIG. 13 may be used to find new map points in a 3D space.

It should be appreciated that for optimization purposes, rather than rendering lines from the keyframes, triangular cones may instead be rendered from the keyframe for more accurate results. The triangular cone is projected such that a rendered line to the N feature (e.g., 2804) represents a bisector of the triangular cone, and the sides of the cone are projected on either side of the Nth feature. In some embodiments, the half angles to the two side edges may be defined by the camera's pixel pitch, which runs through the lens mapping function on either side of the Nth feature.

The interior of the cone may be shaded such that the bisector is the brightest and the edges on either side of the Nth feature may be set of 0. The camera buffer may be a summing buffer, such that bright spots may represent candidate locations of new features, but taking into account both camera resolution and lens calibration. In other words, projecting cones, rather than lines may help compensate for the fact that certain keyframes are farther away than others that may have captured the features at a closer distance. In this approach, a triangular cone rendered from a keyframe that is farther away will be larger (and have a large radius) than one that is rendered from a keyframe that is closer. A summing buffer may be applied in order to determine the 3D map points (e.g., the brightest spots of the map may represent new map points).

Essentially, the AR system may project rays or cones from a number of N unmatched features in a number M prior keyframes into a texture of the M+1 keyframe, encoding the keyframe identifier and feature identifier. The AR system may build another texture from the features in the current keyframe, and mask the first texture with the second. All of the colors are a candidate pairing to search for constraints. This approach advantageously turns the O(MN2) search for constraints into an O(MN) render, followed by a tiny O((<M)N(<<N)) search.

In another approach, new map points may be determined by selecting a virtual keyframe from which to view the existing N features. In other words, the AR system may select a virtual keyframe from which to view the map points. For instance, the AR system may use the above keyframe projection, but pick a new "keyframe" based on a PCA (Principal component analysis) of the normals of the M keyframes from which {M,N} labels are sought (e.g., the PCA-derived keyframe will give the optimal view from which to derive the labels).

Performing a PCA on the existing M keyframes provides a new keyframe that is most orthogonal to the existing M keyframes. Thus, positioning a virtual keyframe at the most orthogonal direction may provide the best viewpoint from which to find new map points in the 3D space. Performing another PCA provides a next most orthogonal direction, and performing a yet another PCA provides yet another orthogonal direction. Thus, it can be appreciated that performing 3 PCAs may provide an x, y and z coordinates in the 3D space from which to construct map points based on the existing M keyframes having the N features.

Figure 14:
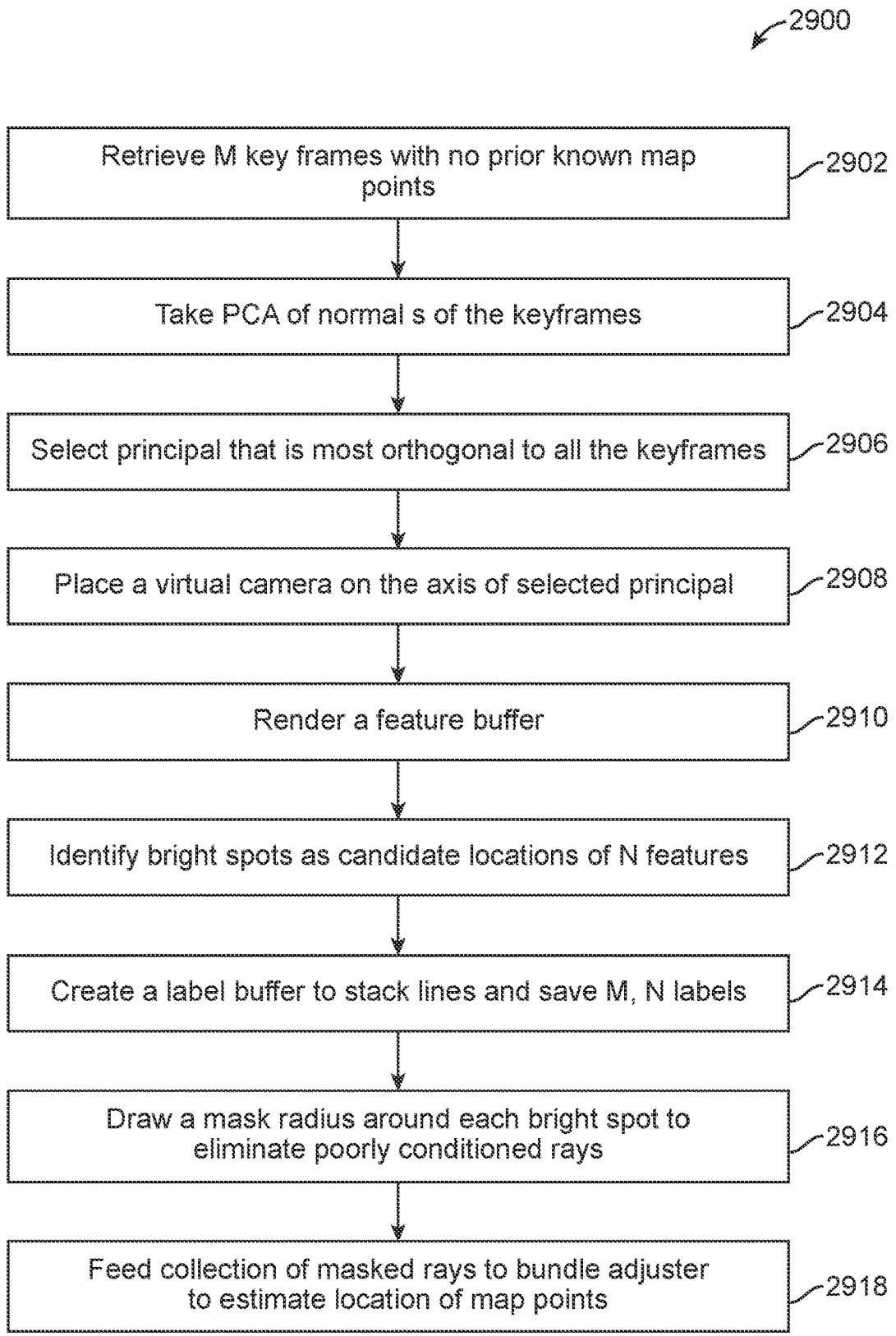
FIG. 14 depicts a high level flow diagram for a process of finding map points based on render rather than search, according to some embodiments.

FIG. 14 describes an example method 2900 for determining map points from M known keyframes. First, at 2902, the AR system retrieves M keyframes associated with a particular space. As discussed above, M keyframes refers to known keyframes that have captured the particular space. Next, at 2904, a PCA of the normal of the keyframes is performed to find the most orthogonal direction of the M keyframes. It should be appreciated that the PCA may produce three principals each of which is orthogonal to the M keyframes. Next, at 2906, the AR system selects the principal that is smallest in the 3D space, and is also the most orthogonal to the view of all the M keyframes.

At 2908, after having identified the principal that is orthogonal to the keyframes, a virtual keyframe may be placed along the axis of the selected principal. In some embodiments, the virtual keyframe may be placed far away enough so that its field of view includes all the M keyframes.

Next, at 2910, the AR system may render a feature buffer, such that rays (or cones) are rendered from each of the M keyframes to the Nth feature. The feature buffer may be a summing buffer, such that the bright spots (pixel coordinates at which lines N lines have intersected) represent candidate locations of N features. It should be appreciated that the same process described above may be repeated with all three PCA axes, such that map points are found on x, y and z axes.

Next, at 2912 the system may store all the bright spots in the image as virtual "features". Next, at 2914, a second "label" buffer may be created at the virtual keyframe to stack the lines (or cones) and to save their {M, N} labels. Next, at 2916, a "mask radius" may be drawn around each bright spot in the feature buffer. It should be appreciated that the mask radius represents the angular pixel error of the virtual camera. The AR system may fill the resulting circles around each bright spot, and mask the label buffer with the resulting binary image. In an optional embodiment, the circles may be filled by applying a gradient filter such that the center of the circles are bright, but the brightness fades to zero at the periphery of the circle.

In the now-masked label buffer, the principal rays may be collected using the {M, N}-tuple label of each triangle. It should be appreciated that if cones/triangles are used instead of rays, the AR system may only collect triangles where both sides of the triangle are captured inside the circle. Thus, the mask radius essentially acts as a filter that eliminates poorly conditioned rays or rays that have a large divergence (e.g., a ray that is at the edge of a field of view (FOV) or a ray that emanates from far away).

For optimization purposes, the label buffer may be rendered with the same shading as used previously in generated cones/triangles). In another optional optimization embodiment, the triangle density may be scaled from one to zero instead of checking the extents (sides) of the triangles. Thus, rays that are very divergent will effectively raise the noise floor inside a masked region. Running a local threshold-detect inside the mark will trivially pull out the centroid from only those rays that are fully inside the mark.

At 2918, the collection of masked/optimized rays m may be fed to a bundle adjuster to estimate and/or correct the location of the newly-determined map points. It should be appreciated that this system is functionally limited to the size of the render buffers that are employed. For example, if the keyframes are widely separated, the resulting rays/cones will have a lower resolution.

In an alternate embodiment, rather than using PCA analysis to find the orthogonal direction, the virtual keyframe may be placed at the location of one of the M keyframes. This may be a simpler and more effective solution because the M keyframes may have already captured the space at the best resolution of the camera. If PCAs are used to find the orthogonal directions at which to place the virtual keyframes, the process above is repeated by placing the virtual camera along each PCA axis and finding map points in each of the axes.

In yet another example method of finding new map points, the AR system may hypothesize new map points. The AR system may retrieve the first three principal components from a PCA analysis on M keyframes. Next, a virtual keyframe may be placed at each principal. Next, a feature buffer may be rendered exactly as discussed above at each of the three virtual keyframes. Since the principal components are by definition orthogonal to each other, rays drawn from each camera outwards may hit each other at a point in 3D space.

It should be appreciated that there may be multiple intersections of rays in some instances. Thus, there may now be N features in each virtual keyframe. Next, a geometric algorithm may be used to find the points of intersection between the different rays. This geometric algorithm may be a constant time algorithm because there may be N3 rays. Masking and optimization may be performed in the same manner described above to find the map points in 3D space.

World Model Refinement

In some embodiments, the AR system may stitch separate small world model segments into larger coherent segments. This may occur on two levels: small models and large models. Small models correspond to a local user level (e.g., on the computational component, for instance belt pack). Large models, on the other hand, correspond to a large scale or system-wide level (e.g., cloud system) for "entire world" modeling. This can be implemented as part of the passable world model concept.

For example, the individual AR system worn by a first user captures information about a first office, while the individual AR system worn by a second user captures information about a second office that is different from the first office. The captured information may be passed to cloud-based computers, which eventually builds a comprehensive, consistent, representation of real spaces sampled or collected by various users walking around with individual AR devices. The cloud based computers build the passable world model incrementally, via use over time. It is anticipated that different geographic locations will build up, mostly centered on population centers, but eventually filling in more rural areas.

The cloud based computers may, for example, perform a hash on GPS, Wi-Fi, room color histograms, and caches of all the natural features in a room, and places with pictures, and generate a topological graph that is the topology of the connectedness of things, as described above. The cloud-based computers may use topology to identify where to stitch the regions together. Alternatively, the cloud based computers could use a hash of features (e.g., the topological map), for example identifying a geometric configuration in one place that matches a geometric configuration in another place.

Exemplary Mapping Systems

Figure 15:
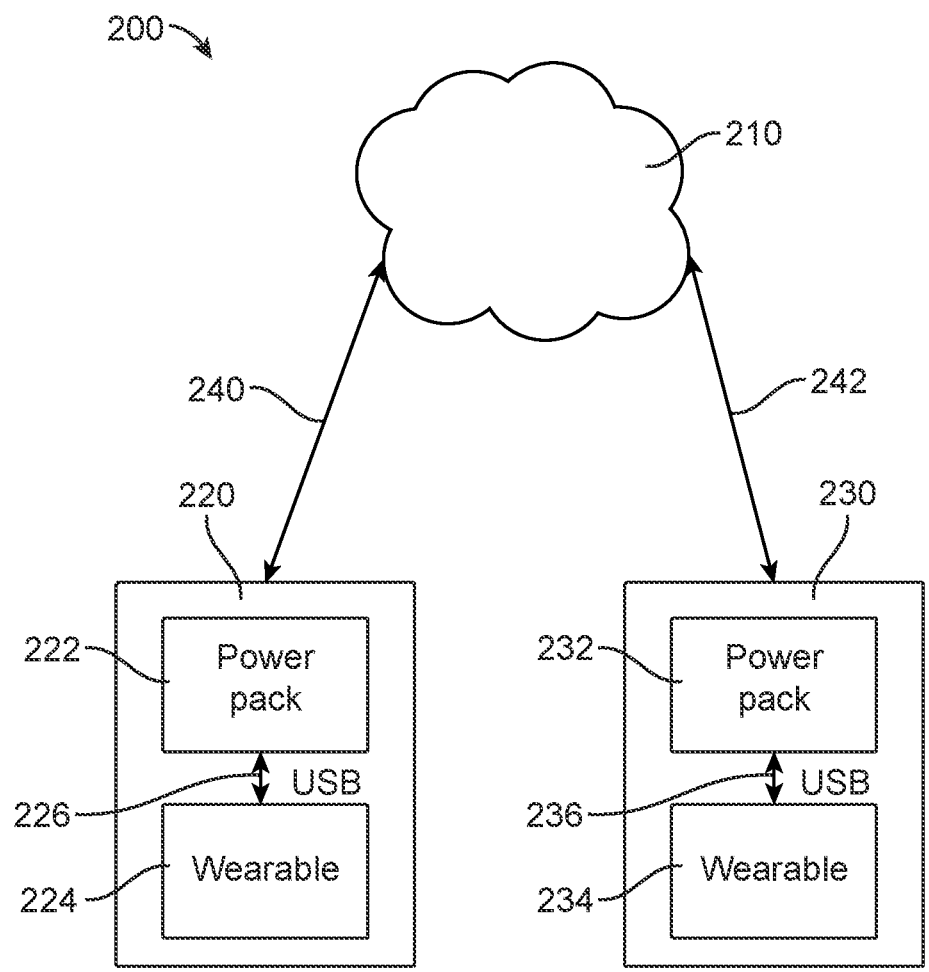
FIG. 15 schematically depicts a mapping system includes a plurality of AR/MR systems, according to some embodiments.

FIG. 15 schematically depicts a mapping system 200 including first and second AR/MR systems 220, 230 according to some embodiments. The first and second AR/MR systems 220, 230 are communicatively coupled to a cloud processing component 210 by first and second networks 240, 242, respectively. Although two networks 240, 242, are depicted in FIG. 15, the various components of the mapping system 200 may be communicatively coupled to each other by more or fewer networks. Each of the first and second networks 240, 242 may be, for example, a wireless or cellular network, a private communication network (e.g., mobile phone network), a Local Area Network (LAN), a Wide Area Network (WAN), and/or other technology capable of enabling one or more computing devices to communicate with one another.

Each of the first and second AR/MR systems 220, 230 has a power pack 222, 232 communicatively coupled to a wearable 224, 234 with respective USB connectors 226, 236. The power packs 222, 232 may have an NVidia/ARM architecture, running a malleus OS. The wearable 224, 234 may have a Myriad/SHAVE architecture, running a minotaur OS. The cloud processing component 210 may have a PC architecture, running a server (e.g., Windows) OS.

Each of the first and second AR/MR systems 220, 230 can perform mapping and map synchronization on its own. Additionally, the first and second AR/MR systems 220, 230 can perform mapping and map synchronization using data from the other system 230, 220 is communicated through the club processing component 210. Sharing data from a plurality of AR/MR systems 220, 230 increases the accuracy of mapping. However, increasing the amount of input data for mapping increases the processor load.

Exemplary Mapping/Map Synchronization Methods

Maps are not static, but are instead constantly generated, modified, and optimize. As such, this state of maps varies over time. Further, factors such as data locality (i.e., the source of data for mapping operations being various components such as the wearable and the power pack) and platform constraints (e.g., processing power and memory) rendered more efficient to distribute certain workload/jobs among various system components such as the wearable 224, the power pack 222, and the cloud processing component 210. The connected nature of AR/MR systems 220 and the communication latency in the connections (e.g., network 240 and USB 226) between the various components results in significant latency in order to achieve map synchronization across component. For instance, in some AR/MR systems, the map is "locked" during each map related operation, and then a copy of the updated map is distributed across the components for the next operation. This latency/lag is unacceptable for many AR/MR systems. Map management takes into account different map related workloads at different times, and synchronization latency of different mapping system components.

Parallel processing between system components (e.g., SHAVES) can reduce system latency. However the differences between system components described above complicate implementation of parallel processing. Some of these complications include triggering of system components at different times, different processing rates for the system components, and different data sets on which system components operate. Asynchronous parallel processing implicates various considerations, such as managing a plurality of readers and writers and operate on the same map. Minimizing the number of concurrent processes reduces system complexity, however some degree of asynchronous parallel processing improves mapping system performance.

Asynchronous Parallel Mapping Workflow

Figure 16:
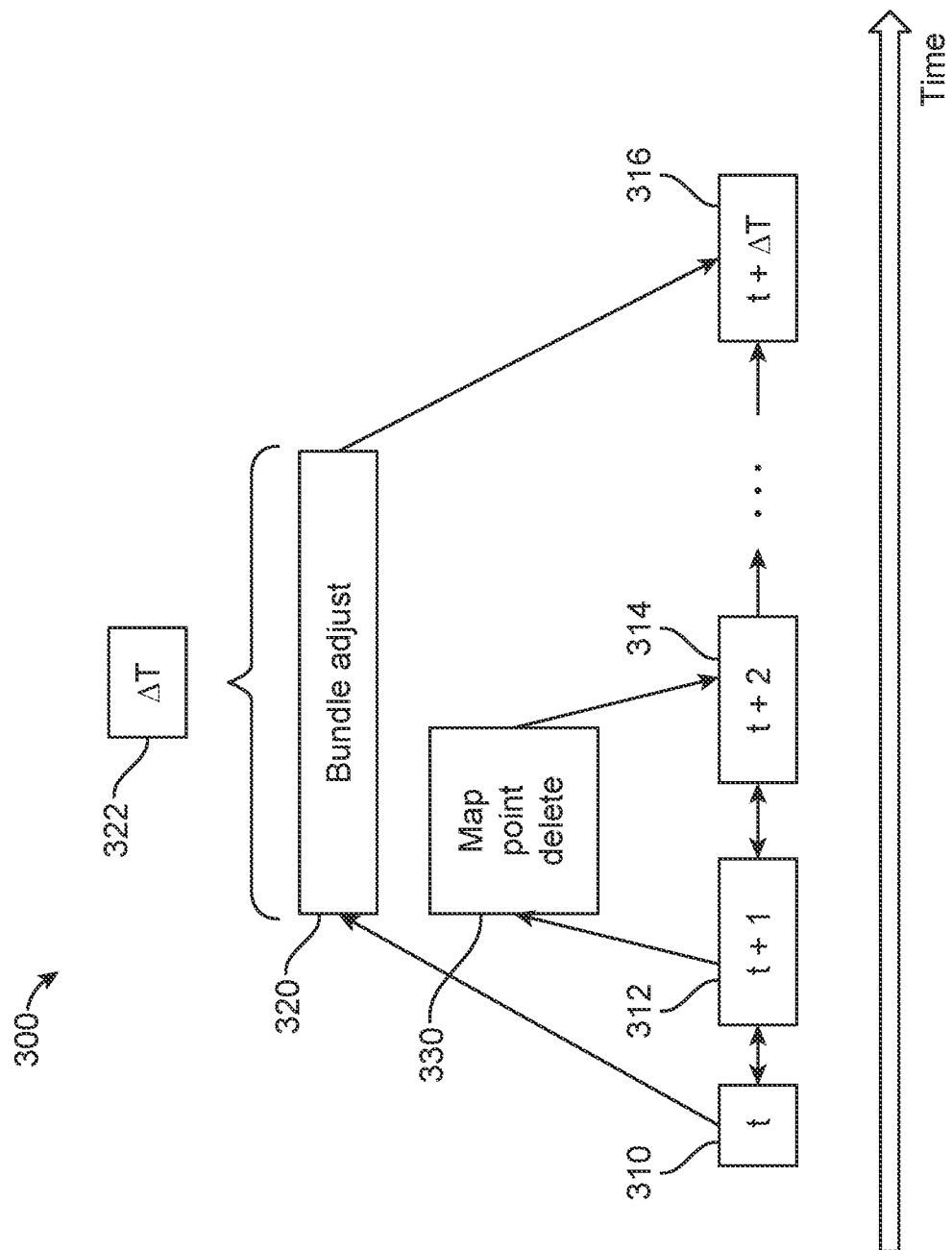
FIG. 16 depicts a workflow for an asynchronous mapping method using a multicomponent mapping system, according to some embodiments.

FIG. 16 depicts a workflow for an asynchronous mapping method 300 for a multicomponent mapping system according to some embodiments. Various map modification techniques involving new data and optimization can be carried out in parallel using the method 300. As described above, new data techniques can include tracking, VIO, mapping, relocalization, map merge, and joint dense optimization. Map modification techniques involving optimization include bundle adjustment and loop closure. New data techniques are efficiently performed at the system component that is the source of the new data. Optimization techniques are processing intensive and are thus more efficiently performed at the power pack. During optimization, special consideration is required for persistent points and dense mapping.

At time "t" 310, a bundle adjustment (optimization) operation 320 begins working on a snapshot of a sparse map. Because the bundle adjustment 320 is a processing intensive operation, the bundle adjustment 320 takes a relatively long amount of time ΔT 322 to complete. As discussed above, the processing intensive bundle adjustment 320 may be carried out by the power pack.

During execution of the bundle adjustment 320, another component (e.g., the wearable) may execute a map point deletion 330 (e.g., because a map point was determined to be an outlier). The map point deletion 330 begins working on a later snapshot of the sparse map at time "t+1" 312. Because the map point deletion 330 is a relatively less processing intensive operation, the map point deletion 330 can be completed during the bundle adjustment 320. At time "t+2" 314, the wearable has completed the map point deletion 330.

After the map point deletion 330 is completed, the system may perform other operations during the bundle adjustment 320. Finally, at time "t+ΔT" 316, the bundle adjustment is completed. This workflow 300 allows multiple map related operations (bundle adjustment 320, map point deletion 330, etc.) to be executed by different components of the mapping system in parallel, thereby reducing the amount of latency/lag in the mapping system. The parallel execution of multiple map related operations is described in further detail below. In particular, if the map point that was deleted is also part of the bundle adjustment operation, there may be a conflict between the two operations (bundle adjustment 320 and map point deletion 330).

Data Conflict During Asynchronous Parallel Mapping

Figure 17A:
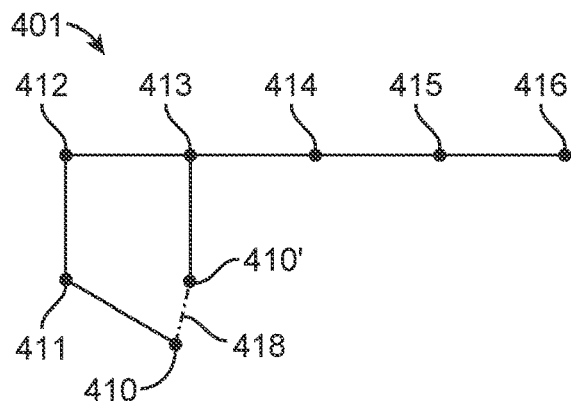
FIGS. 17A-17D depict a plurality of exemplary loop closure operations, according to some embodiments.

FIGS. 17A to 17D depict a plurality of exemplary loop closure operations that may result in data conflict with asynchronous parallel mapping. FIG. 17A depicts six keyrig frames 410, 411, 412, 413, 414, 415, and 416 as dots in a map 401. A loop 418 is detected between keyrig frames 410 and 410'.

Figure 17B:
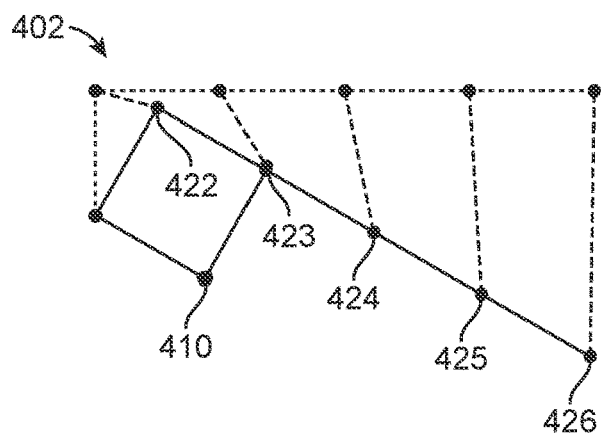

FIG. 17B depicts closing of the loop 418 with a fixed origin 410 by moving keyrig frames 422, 423, 424, 425, and 426 to generate new map 402.

Figure 17C:
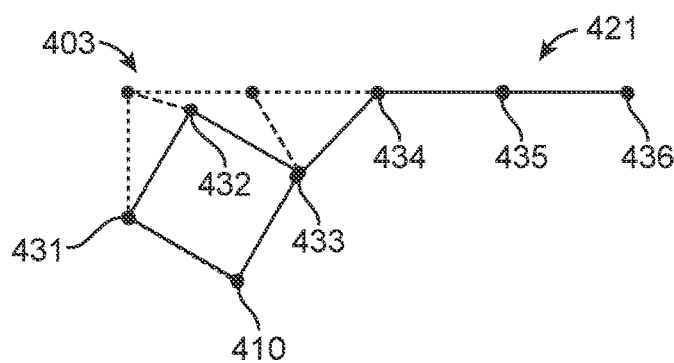

FIG. 17C depicts closing of the loop 418 with fixed origin 410. Due to asynchronous workloads, loop 438 is detected at a time corresponding to the generation of keyrig frame 433. As such, loop 438 is closed by moving keyrig frames 432 and 433. One or more separate workloads generates keyrig frames 434, 435, and 436. The map 403 resulting from loop closure at keyrig frame 433 followed by generation of keyrig frames 434, 435, and 436 has a shape that is very different from the maps 401, 402 in FIGS. 17A and 17B.

Figure 17D:
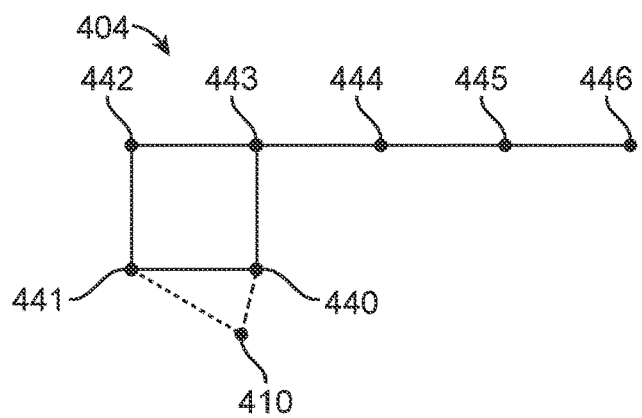

FIG. 17D depicts closing of the loop 418 while allowing movement of the origin 410 to new position 440 according to some embodiments. This loop closure can be performed during generation of keyrig frames 441, 442, 443, 444, 445, and 446 without generating an anomalous shape. For instance, the map 404 in FIG. 17D is much closer to the maps 401, 402 in FIGS. 17A and 17B as compared to the map 403 in FIG. 17C.

Map management design includes recognition and resolution/reconciliation of conflicts such as these and numerous other possible mapping conflicts with asynchronous workloads. Resolution/reconciliation includes a determination of whether the initial state used to generate a state change is still valid, and whether we should apply the state change. These conflicts are data and time dependent, further complicating the resolution/reconciliation process in map management.

Asynchronous Parallel Mapping Workflow with Map Management

Figure 18:
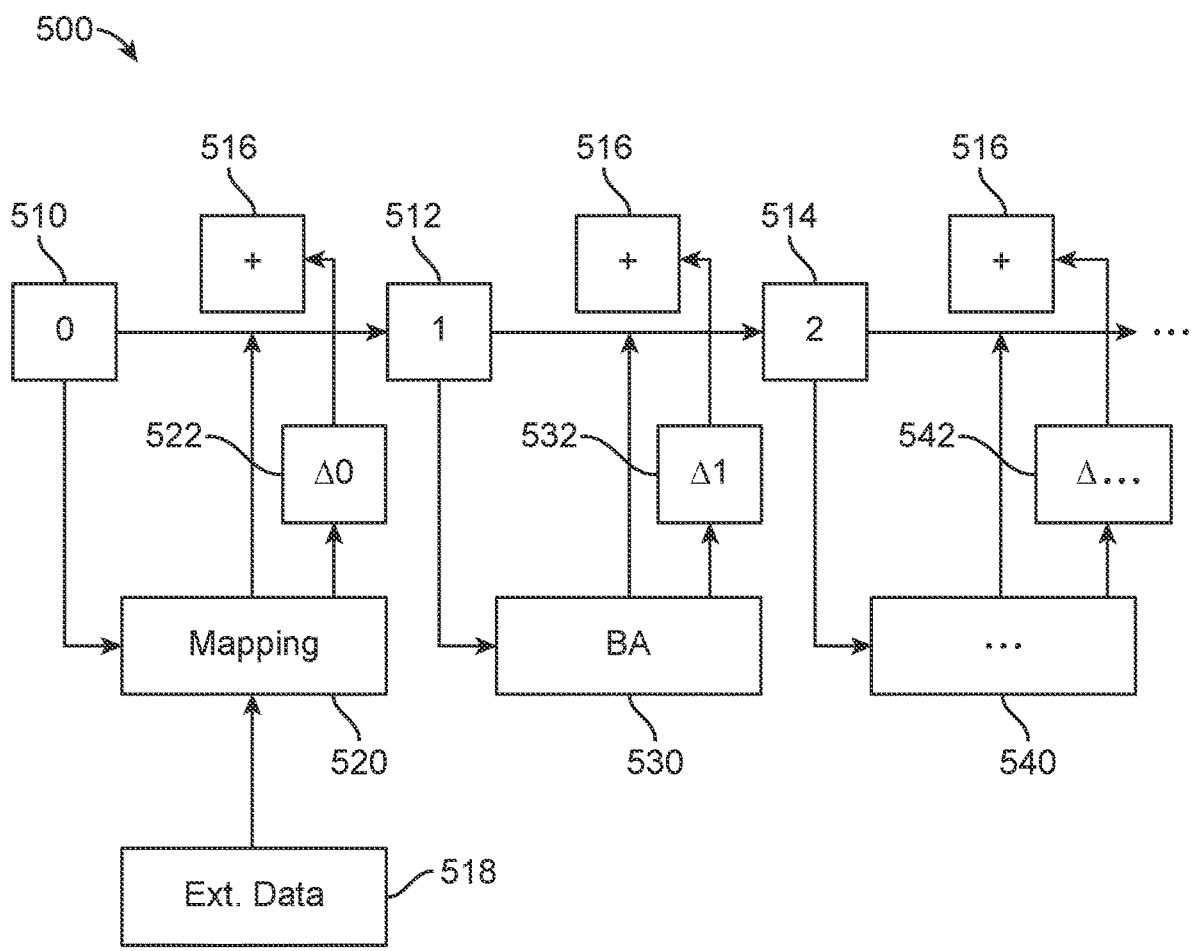
FIG. 18 depicts a workflow for an asynchronous mapping method using a multicomponent mapping system with map management, according to some embodiments.

FIG. 18 depicts a workflow for an asynchronous mapping method 500 for a multicomponent mapping system with map management according to some embodiments. The mapping method 500 includes a unique timeline that is maintained by a map manager (described below), but is not necessarily represented as a time index collection of states. FIG. 18 includes three states 510, 512, 514. The "+" operator 516 represents application of a change (e.g., "Δ0" 522) to a previous state to generate the next state.

Changes are produced by various map operations in the method 500. For instance, a mapping operation 520 receives as input the state at execution of the mapping operation 520

(i.e., state zero 510) and external data 518. State zero 510 may be the special state with the map is empty. The output of the mapping operation 520, as with all map operations in method 500, is not a new state, but rather a state change (i.e., Δ0 522). Similarly, a bundle adjustment operation 530 receives as input the state at execution of the bundle adjustment operation 530 (i.e., state one 512) and other data (not shown). The output of the bundle adjustment operation 530 is another state change (i.e. Δ1 532). Further, a plurality of other map operations 540 can output a respective plurality of state changes 542.

The "+" operations 516 applying various state changes (i.e., Δ0 522, Δ1 532, Δ . . . 542) to previous states to generate the next state. For instance, state change Δ0 522 is applied to state zero 510 to generate state one 512. Similarly, state change Δ1 532 is applied to state one 512 to generate state two 514. The state changes 522, 532, 542 are applied in order of state progression as long as there is no conflict. If there a conflict between the state and the state change is detected, the conflicts between the state and the state change are resolved/reconciled during the "+" operations 516. Conflict resolution is implementation dependent because the types of conflicts depend on the modification being applied to the map.

System components read snapshots of the various states 510, 512, 514 and other data as may be needed for use by the various mapping operations 520, 530, 540. Similarly, system components write state changes 522, 532, 542 that contain the modifications to the map resulting from the various mapping operations 520, 530, 540. The state changes 522, 532, 542 are applied shortly after being received to create new map states 512, 514. Various components that execute operations dependent on map states can subscribe to the state changes.

Accordingly, a given map state can be determined by an initial state and in order to sequence of state changes. For instance, given an initial state zero 510, and state changes 522 and 532, a map state can be defined as state zero 510 "+" state change 522 "+" state change 532. Consequently, a globally agreed initial map state and ordering of state changes allows different system components to perform mapping operations and generate state changes while running on different platforms at different rates.

A map manager determines the initial map state and ordering of state changes, and sends/pushes/broadcasts/replicates this mapping data to all system components to allow asynchronous parallel mapping while maintaining a consistent map between all components of the system. Each system component has a map manager that will eventually access all state changes produced in the system. The ordered state changes function as a virtual bus that connects all system components and the map managers therein.

Figure 19:
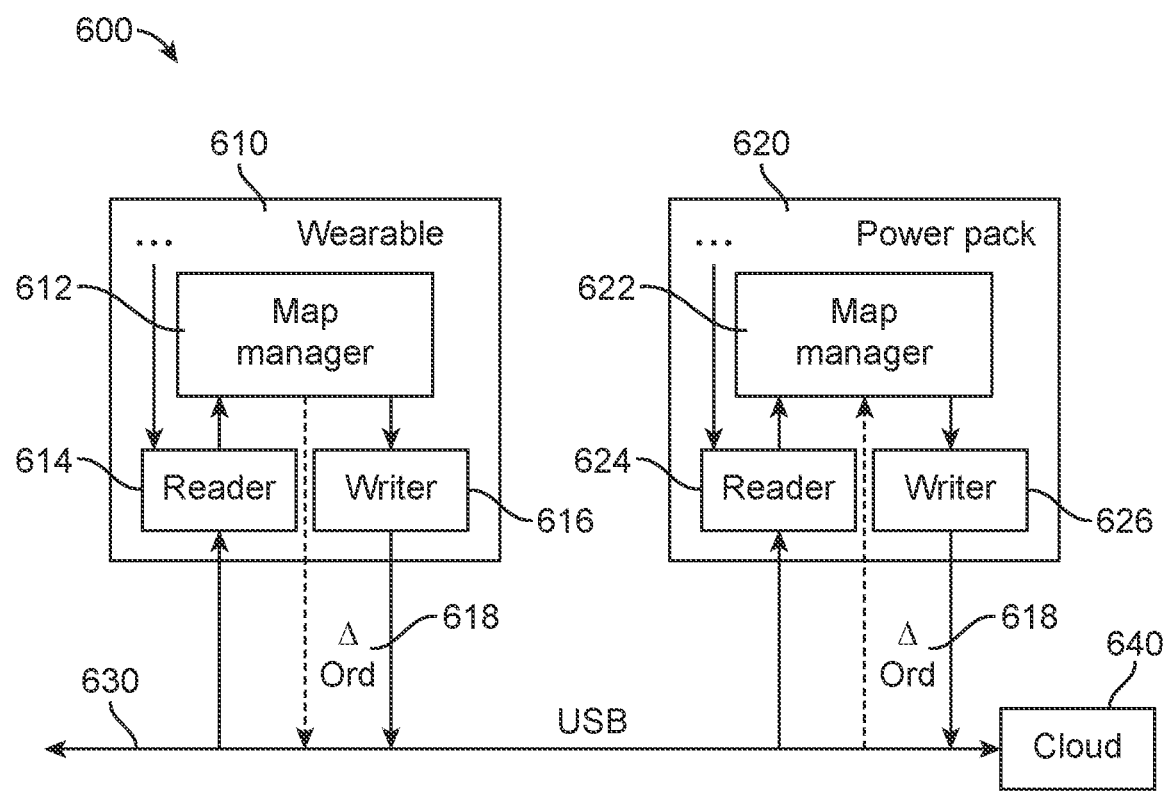
FIG. 19 schematically depicts an AR/MR system for mapping and map synchronization, according to some embodiments.

FIG. 19 depicts an AR/MR system 600 for mapping and map synchronization. The system 600 includes a wearable 610 and a power pack 620 communicatively coupled by a USB communication link 630 to each other and to a cloud processing components 640. Each of the wearable 610 and the power pack 620 include a map manager 612, 622, a reader 614, 624, and a writer 616, 626. Each of the map managers 612, 622, readers 614, 624, and writers 616, 626 are communicatively coupled to the USB communication link 630, which forms a virtual bus that connects all system components.

The readers 614, 624 receive data from the USB communication link 630 and other sources in their respective components 610, 620. The data received by the reader 614, 624 include state changes. The reader 614, 624 sends the received data to the map managers 612, 622.

The map managers 612, 622 process the data received from the readers 614, 624. The map manager 612 in the wearable 610 generates a change order 618 corresponding to the order of state changes from the initial state as described above. The change order 618 is generated based on when the state changes are to be applied to the various states. This order is generally related to the times at which the wearable map manager 612 receives the state changes. If more than one state change arrives at the wearable map manager 612 at one time, the map manager 612 decides how to order the simultaneously writing state changes.

The map manager 612 in the wearable 610 sends the change order 618 to the map manager 622 in the power pack 620. The change order 618 allows the system components 610, 620 and virtual bus 630 to function asynchronously, such that the map managers 612, 622 can receive state changes from the different system components 610, 620 in a sequence different from the change order 618. The change order 618 allows the map managers 612, 622 to apply the received state changes in an agreed-upon order to synchronize the maps across system components 610, 620.

In some embodiments, reordering of state changes based on the change order 618 does not change the order of state changes generated by the system component including a particular map manager relative to each other. Further, state changes can be modified to include only data relevant to the map in a particular system component (e.g., a smaller map stored in a wearable as described below) in order to more efficiently utilize the virtual bus 630.

The map manager 612, 622 send data to the writers 616, 626. Such data may include state changes and, in some embodiments, the change order 618. The writers 616, 626 in turn send the data to the virtual bus 630. The virtual bus 630 distributes the state changes in the change order 618 between the system components 610, 620 so that each component 610, 620 eventually receives all state changes and the change order 618. Because the map is not static, the system components 610, 620 constantly send map updates to each other across the virtual bus 630. The virtual bus 630 also connects to the cloud processing component 640, which may keep its own map for use across multiple mapping systems connected thereto. The cloud processing components 640 may have a map manager, a reader, and a writer (not shown) like those in the other system components 610, 620.

Figure 20:
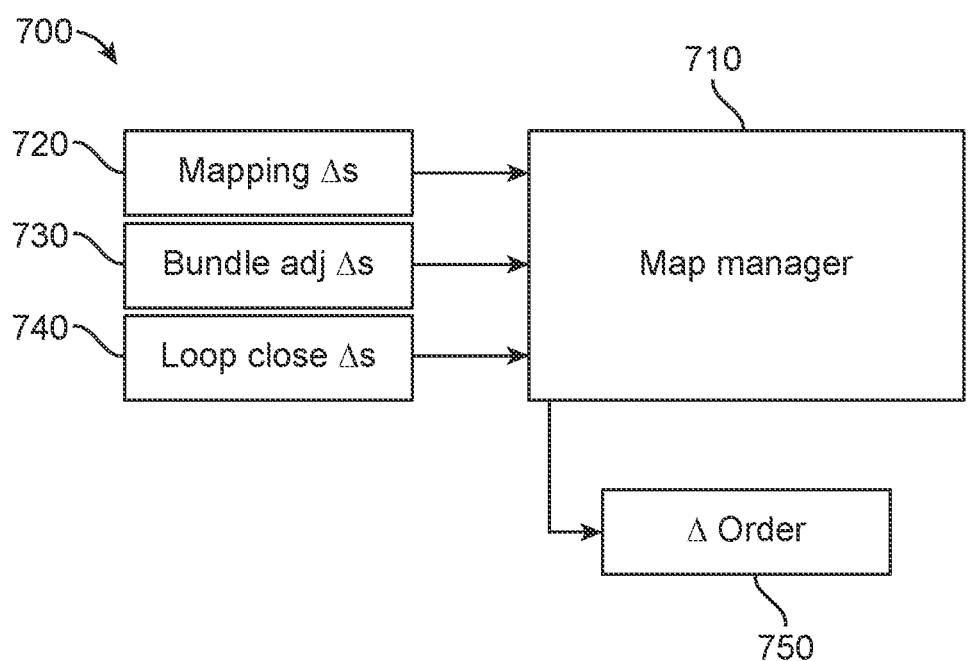
FIG. 20 schematically depicts a wearable map manager of an AR/MR system for mapping and map synchronization generating a change order, according to some embodiments.

FIG. 20 depicts a wearable map manager 710 generating a change order 750 by analyzing a plurality of received state changes. The state changes include mapping state changes 720, bundle adjustment state changes 730, and loop closure state changes 740. The state changes may be generated by different system components. For instance, some of the mapping state changes 720 may be generated by a wearable, and the bundle adjustment state changes 730 and the loop closure state changes 740 may be generated by a power pack. Each state change can be uniquely identified by a compose key, which identifies the writer and a sequence count or timestamp. For example, if each writer produces to state changes the compose keys may be:

Mapping: MapDelta(0), MapDelta(1)
BundleAdjust: BundleAdjust(0), BundleAdjust(1)
LoopClosure: LoopClosure(0), LoopClosure(1)

The wearable map manager 710 analyzes the received state changes and generates a change order 750. Continuing with the example of compose keys listed above, the change order may be communicated as a single stream of state changes that also represents the global ordering of those state changes. An exemplary change order is a "MapDelta (0), BundleAdjust(0), MapDelta(1), LoopClosure(0), BundleAdjust(1), LoopClosure(1)". The other map managers and the system eventually receive the same state changes in the change order 750 from the wearable map manager 710.

Figure 21:
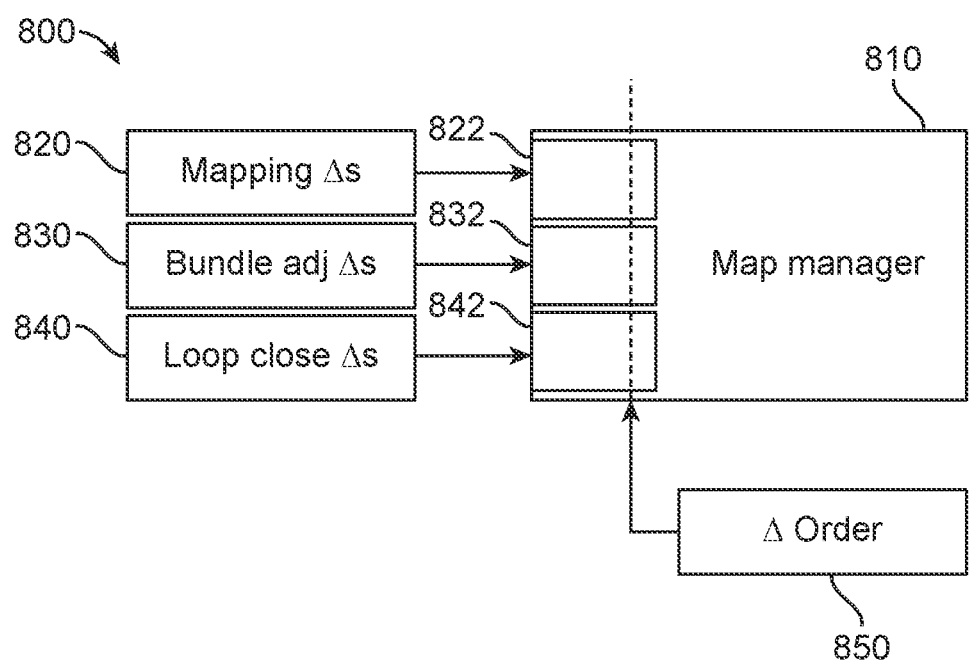
FIG. 21 schematically depicts a power pack map manager of an AR/MR system for mapping and map synchronization applying a plurality of received state changes based on a change order, according to some embodiments.

FIG. 21 depicts a power pack map manager 810 applying a plurality of received state changes based on a received change order 850. The state changes include mapping state changes 820, bundle adjustment state changes 830, and loop closure state changes 840. The state changes may be generated by different system components. For instance, some of the mapping state changes 820 may be generated by a wearable, and the bundle adjustment state changes 830 and the loop closure state changes 840 may be generated by a power pack. The change order 850 may have been generated by a wearable map manager and received through a virtual bus. In order to apply the received state changes 820, 830, 840 in the sequence encoded in the received change order 850, the power pack map manager 810 includes a plurality of buffers 822, 832, 842 two stories the received state changes 820, 830, 840 until they are called up by the change order 850. If the next state change according to the change order 850 is available, the power pack map manager 810 will apply the next a change. If the next a change according to the change order 850 is not available, the power pack map manager 810 will wait for the next state change to be received and operate in an asynchronous manner. If state changes arrive before the change order 850, the power pack map manager 810 will wait for the change order 850 to arrive and operate in an asynchronous manner.

The "+" operation described above for applying state changes to states is configured to be substantially similar across system components. This allows state changes to be distributed and apply across different system components. The "+" operation can be configured for execution by the wearable and power pack by deleting the binaries for the device from the manifest. For cloud processing components, the "+" operation can be configured by deleting the cloud binaries from the manifest or explicit versioning of the "+" operator, etc.

Figure 22:
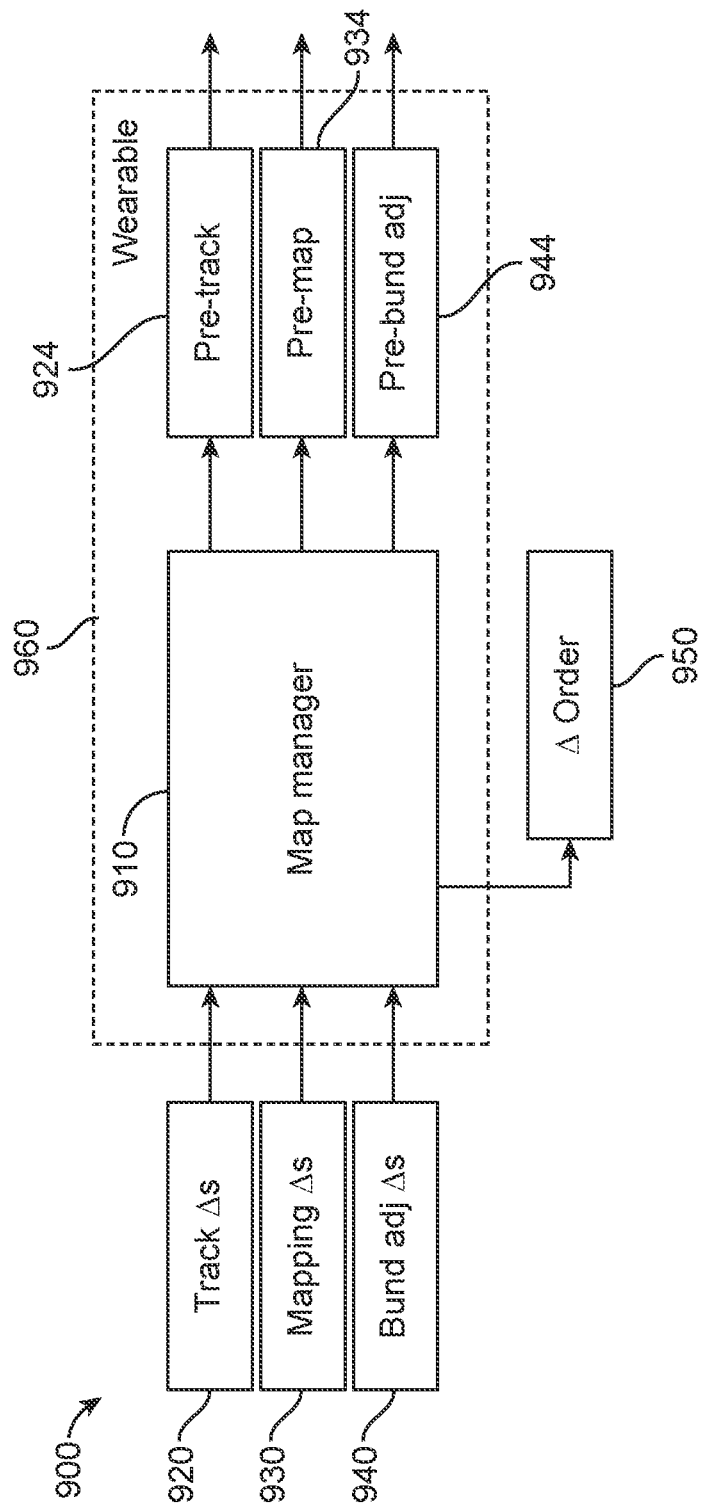
FIG. 22 schematically depicts a wearable map manager of an AR/MR system for mapping and map synchronization processing a plurality of received state changes and generating a change order, according to some embodiments.

FIG. 22 depicts a wearable map manager 910 processing a plurality of received state changes. The state changes include tracking state changes 920, mapping state changes 930, and bundle adjustment state changes 940. The state changes may be generated by different system components. For instance, some of the tracking state changes 920 and mapping state changes 930 may be generated by a wearable, and the bundle adjustment state changes 940 may be generated by a power pack. The wearable map manager 910 generates a change order 950 from the received state changes 920, 930, 940. In order to minimize locking of the map, the wearable map manager 910 also execute reader jobs Pre-Track 924, Pre-Map 934, and Pre-Bund Adjust 944 to create snapshots of the map for the respective state changes.

Figure 23:
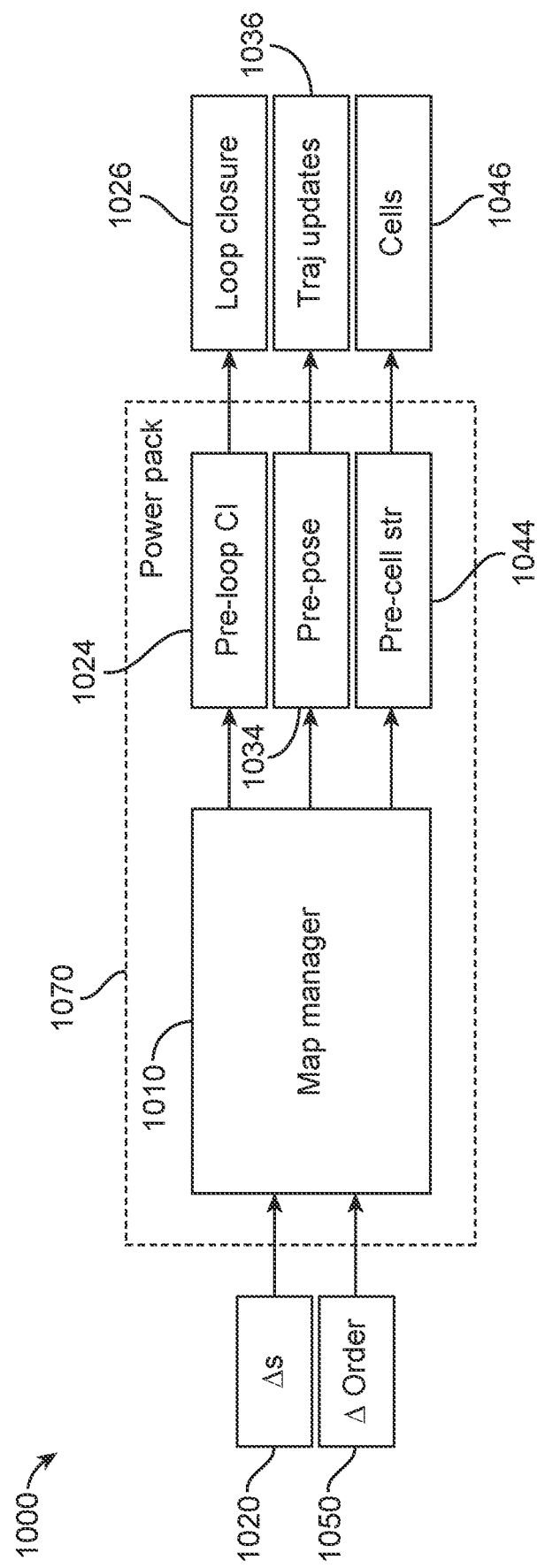
FIG. 23 schematically depicts a power pack map manager of an AR/MR system for mapping and map synchronization processing a plurality of received state changes based on a change order, according to some embodiments.

FIG. 23 depicts a power pack map manager 1010 processing a plurality of received state changes 1020 based on a received change order 1050. The state changes may be generated by different system components, and the change order may be generated by a wearable. The power pack map manager 1010 generates a change order 1050 from the received state changes 1020, 1030, 1040. In order to minimize locking of the map, the power pack map manager 1010 also execute reader jobs Pre-Loop Cl 1024, Pre-Pose 1034, and Pre-Cell Str 1044 to create snapshots of the map for the respective state changes. The snapshots may include only data needed for the particular reader jobs. After the snapshots are taken, the map manager may execute different reader jobs on the map. Generating the snapshots allows actual map processing to occur off-line, thereby minimizing the amount of time the map is locked for processing.

The power pack map manager 1010 executes the state changes 1020 based on the change order 1050 and triggers downstream jobs corresponding to the previously executed reader jobs 1024, 1034, 1044 and the snapshots generated thereby. The trigger downstream jobs include loop closure 1026, trajectory updates 1036, and cell streaming 1046.

The embodiments described above facilitate asynchronous parallel mapping using mapping systems including map managers, states changes, and change orders to synchronize maps across system components. This reduces system latency/lag, thereby enabling improved real time system performance.

Cell Streaming

Figure 24:
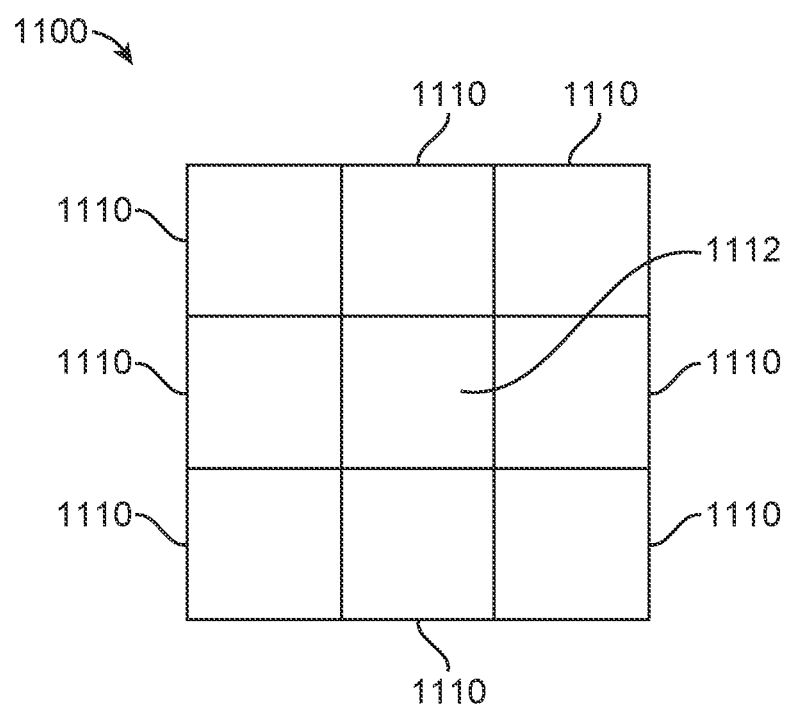
FIGS. 24 and 25 schematically depict a cell streaming method in a multiple component mapping system, according to some embodiments.
Figure 25:
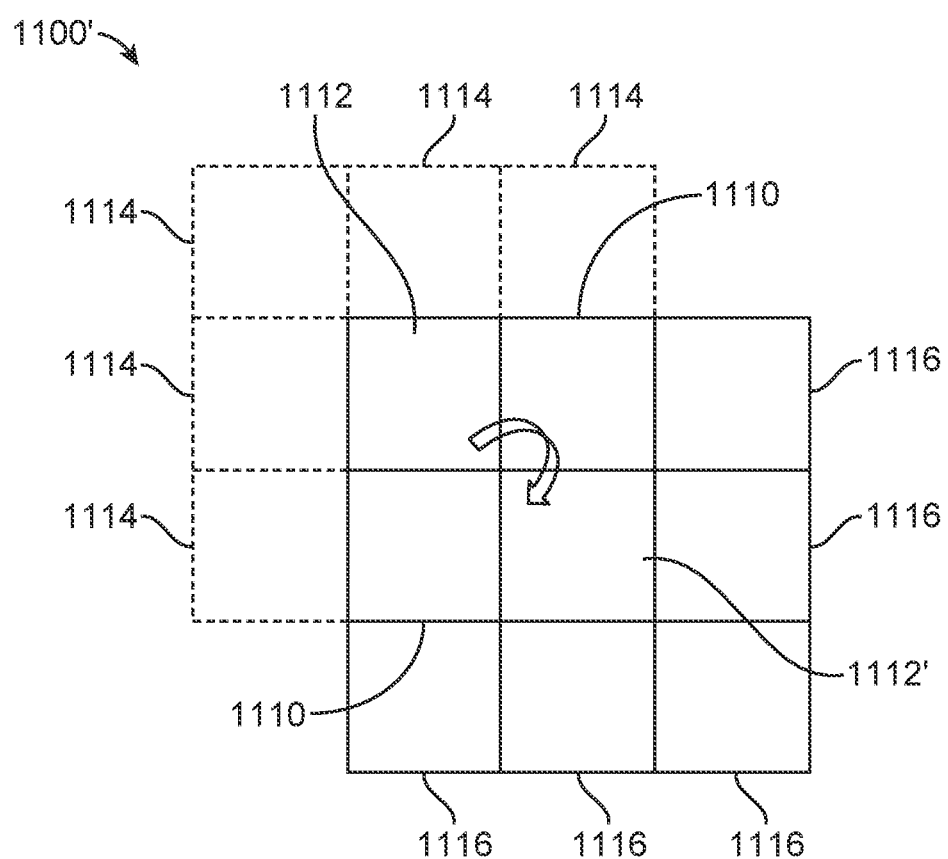

FIGS. 24 and 25 depict a cell streaming method in a multiple component mapping system. This method addresses the memory limitations of wearables by storing a smaller map 1100 in the wearable and a larger map (not shown) including the smaller map 1100 in the power pack or a cloud processing component (not shown).

As shown in FIG. 24, the larger map has been divided into a plurality of map subunits/cells 1110, 1112, and the smaller map 1100 includes a first subset of the plurality of map subunits 1110, 1112. The smaller map 1100 is a 3×3×1 subunit 3D array, with each subunit 1110, 1112 measuring approximately 7 m×7 m×7 m. In other embodiments, the smaller map (not shown) may be a 10×10×1 subunit 3D array, or a 6×6×3 3D subunit array. The smaller map 1100 also includes a central map subunit 1112 corresponding to the current location of the mapping system/user.

FIG. 25 shows streaming of cells with movement of the mapping system/user from the previous central map subunit 1112 to the updated central map subunit 1112'. The updated smaller map 1100' depicted in FIG. 25 includes more varieties of map subunits 1110, 1112, 1112', 1114, 1116. These new map subunits 1112', 1114, 1116 are identical to the map subunits 1110, 1112 shown in FIG. 24. For instance, each map subunits 1110, 1112, 1112', 1114, 1116 measures approximately 7 m×7 m×7 m. When the mapping system/user moves to the updated central map subunit 1112', map subunits 1114 are more than one map subunit away from the mapping system/user. Accordingly, a portion of the first subset of the plurality of map subunits defining the smaller map 1100 in FIG. 24 made up of map subunits 1114 is deleted from the memory of the wearable.

The wearable also receives (e.g., from the power pack) a second subset of the plurality of map subunits 1116 such that the remaining map subunits 1110, 1112 from the first subset of the plurality of subunits and the second subset of the plurality of map subunits 1116 fully surround the updated central map subunit 1112'. The second subset of the plurality of map subunits 1116 is stored in the memory of the wearable made available by deleting map subunits 1114, as described above.

The method depicted in FIGS. 24 and 25 allows the wearable to access the map subunits needed for various mapping functions while minimizing the demands on the limited memory in the wearable by unloading unneeded map subunits before loading new map subunits. The method maintains at least one map subunit in each direction in the X-Y plane from the central map unit. Accordingly, map subunits can be swapped while maintaining some map data for mapping functions (e.g., tracking) during the swapping process. While the movement depicted in FIGS. 24 and 25 is a diagonal movement, any other movements in the X-Y plane can be followed by updates of the smaller map in the wearable according to the method described above.

Using the method depicted in FIGS. 24 and 25, or other similar methods, a sparse map can be represented as: SparseMap(t)={$Cell_1(t)$, $Cell_2(t)$, . . . , $Cell_N(t)$}. As described above, state changes can be applied to sparse maps resulting in SparseMap(t+1)=SparseMap(t) "+" State Change(t). When the "+" operator has a distributive property, state changes can be applied to sparse maps as follows:

$$\begin{aligned} SparseMap(t) \text{ "+" State Change}(t) &= \{Cell_1(t), Cell_2(t), \ldots, Cell_N(t)\} \text{ "+"} \\ & \quad \text{State Change}(t) \\ &= \{Cell_1(t) \text{ "+" State Change}(t), \\ & \quad Cell_2(t) \text{ "+" State Change}(t), \ldots, \\ & \quad Cell_N(t) \text{ "+" State Change}(t)\} \\ &= \{Cell_1(t+1), Cell_2(t+1), \ldots, \\ & \quad Cell_N(t+1)\} \\ &= SparseMap(t+1). \end{aligned}$$

As such, state changes can be applied on a personal level, without accessing the state of all the cells in the complete sparse map (e.g., as in the wearable).

During cell streaming, a snapshot of a map subunits/cell is copied over from the power pack to the wearable. Due to the size of some maps, by the time the last map subunit is received at the wearable, the first map subunit received by the wearable may be out of date relative to map processes performed at the power pack. Using a per cell state change method, state changes can be applied to the first map units received by the wearable to bring them up-to-date.

The cell streaming method described above also allows wearables to perform map related functions while storing only a portion of a complete sparse map of a local environment. By streaming the map subunits from the power pack based on movement of the mapping system/user, memory usage is kept to a minimum in the wearable while maintaining sufficient map data for the wearable to perform many map functions.

Zero Copy Data Transfer

FIGS. 26 and 27 depict a data structure for zero copy data transfer across a relatively low bandwidth communication channel such as a USB connector. Zero copy data transfer can be used in the cell swapping mechanism depicted in FIGS. 24 and 25 and described above to reduce latency in the USB communication channel between the wearable and the power pack. Using the depicted data structure and zero copy data transfer, the USB communication channel can write data directly into the system component memory that will be used in various mapping operations. This is an improvement over current systems where data from the USB communication channel is first written to a buffer in the system component, then written from the buffer to the system component memory. As such, zero copy data transfer reduces both memory usage and processor usage for copying data.

Zero copy data transfer uses ownership and cell state data indicators/tags. As shown in FIG. 26, a particular cell's ownership can be "NONE," "MAP," or "USB". Similarly, a particular cell's state can be "INVALID," "MAP," or "USB". The map may be an array of cells each of which has an individual owner and state. The map may also include enough cells to cover transient situations as cells enter and leave the map.

Initially, a cell has been ownership of "NONE" and a state of "INVALID". When the cell is being transferred over the USB connection, its ownership is set to "USB" or "Comm2" and its state is set to "USB". When the transfer is complete and the cell is being used by the system, its ownership and state are both set to "MAP". The cells can be accessed by various mapping operations/jobs using a reader and a writer. Only a single instance of a writer may be allowed in the mapping system. Multiple instances of readers may be allowed in the mapping system, but simultaneously reading and writing is not allowed.

When a particular map operations/job begins, a framework will pass the reader and/or writer as appropriate to the corresponding system component. A cell list includes pointers to all cells currently owned by the map and a count of those cells. At the end of the map operation/job, the writer will populate a request array. The request array instructs the framework to perform one of three functions to each cell of the map. The invalidate requests marks cells as ownership "NONE" and state "INVALID". The send requests marks cells for transfer as ownership "USB" or "Comm2" and state "USB". After the transfer is complete the send requests marks the cells as ownership "NONE" and state "INVALID". A debug requests sends a cell without marking it "INVALID". As such, during a debug, the system component does not change the cell.

Ownership is transferable between the USB communication channel ("USB") and the system component working on the cell ("MAP"). Because ownership can be changed with a simple pointer operation without copying the data in the cell, changing ownership of cells being transferred is relatively low-cost to the processor and memory.

System Architecture Overview

Figure 28:
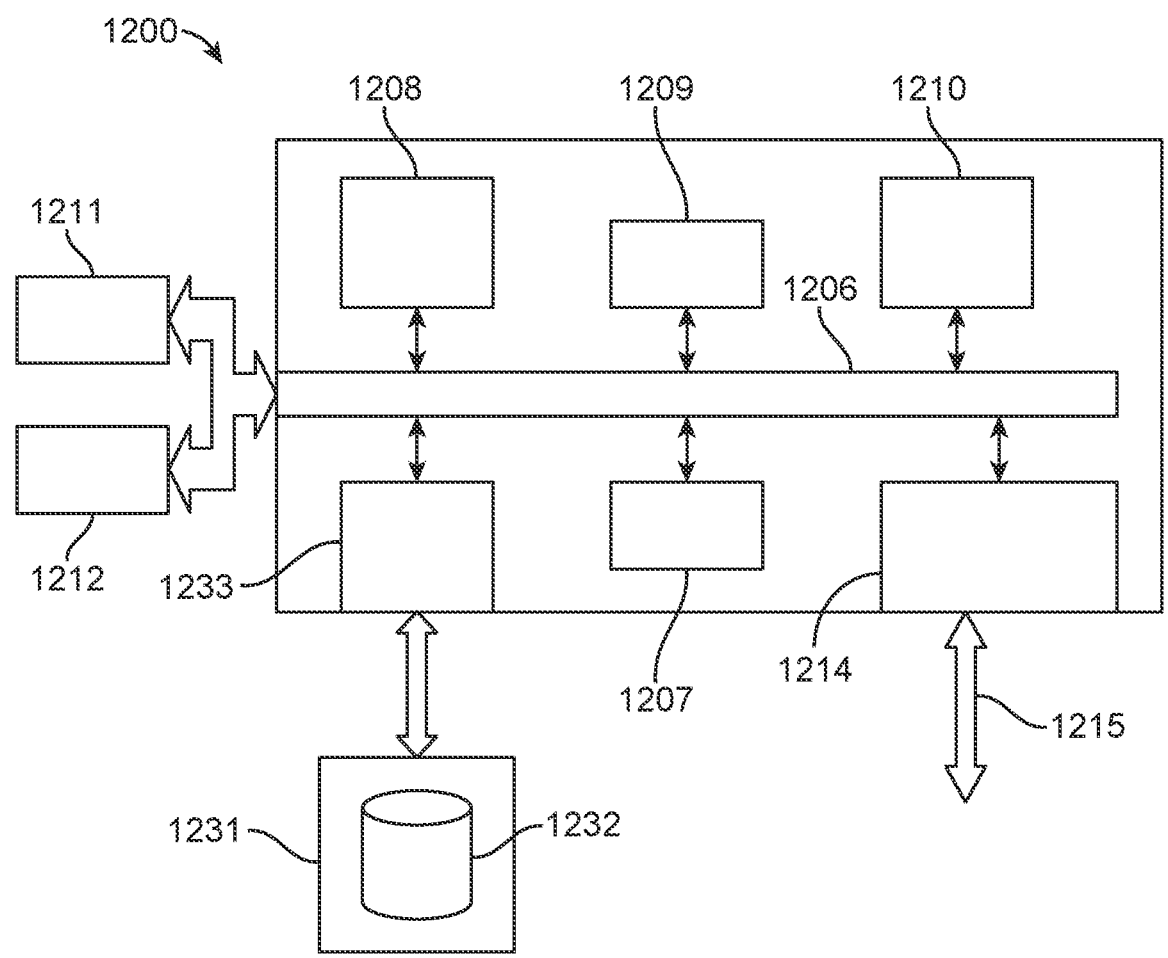
FIG. 28 is a block diagram schematically depicting an illustrative computing system, according to some embodiments.

FIG. 28 is a block diagram of an illustrative computing system 1200 suitable for implementing an embodiment of the present disclosure. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to one embodiment of the disclosure, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1200. According to other embodiments of the disclosure, two or more computer systems 1200 coupled by communication link 1215 (e.g., LAN, PTSN, or wireless network) may perform the sequence of instructions required to practice the disclosure in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. Database 1232 in storage medium 1231 may be used to store data accessible by system 1200 via data interface 1233.

The disclosure includes methods that may be performed using the subject devices. The methods may comprise the act of providing such a suitable device. Such provision may be performed by the user. In other words, the "providing" act merely requires the user to obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A computer implemented method for updating a point map on a system having first and second communicatively coupled hardware components, comprising:
the first component performing a first process on the point map in a first map state to generate a first map change, wherein the first map state is a state of the point map;
the second component performing a second process on the point map in the first map state to generate a second map change;
the second component applying the second map change to the point map in the first map state to generate a first updated point map in a second map state, wherein the second map state is a state of the first updated point map;
the first component sending the first map change to the second component; and
the second component applying the first map change to the first updated point map in the second map state to generate a second updated point map in a third map state, wherein the third map state is a state of the second updated point map.

2. The method of claim 1, further comprising:
the second component sending the second map change to the first component;
the first component applying the second map change to the point map in the first map state to generate the first updated point map in the second map state; and
the first component applying the first map change to the first updated point map in the second map state to generate the second updated point map in the third map state.

3. The method of claim 2, further comprising:
the first component generating a map change order based on the first and second map changes; and
the first component applying the second map change to the point map in the first map state before apply the first map change to the updated point map in the second map state based on the map change order.

4. The method of claim 2, wherein the first component applying the second map change to the point map in the first map state includes the first component generating a pre-change first map state, and
wherein the first component applying the first map change to the first updated point map in the second map state includes the first component generating a pre-change second map state.

5. The method of claim 1, wherein the second component applying the second map change to the point map in the first map state includes the second component generating a pre-change first map state, and
wherein the second component applying the first map change to the first updated point map in the second map state includes the second component generating a pre-change second map state.

6. The method of claim 1, further comprising:
the first component generating a map change order based on the first and second map changes; and
the first component sending the map change order to the second component.

7. The method of claim 6, further comprising the second component applying the second map change to the point map in the first map state before applying the first map change to the updated point map in the second map state based on the map change order.

8. The method of claim 1, wherein the first process is selected from the group consisting of tracking, map point deletion, VIO, mapping, insertion of new keyframe/key rigframe, insertion of new map point, insertion of new observation, bundle adjustment, modification of sparse map geometry, online calibration, relocalization, adding new orb feature; add new BoW index; loop closure; modify sparse map geometry; map merge; and joint dense optimization.

9. The method of claim 1, wherein the point map corresponds to a physical location in which the system is located.

10. The method of claim 9, wherein the physical location is a room.

11. The method of claim 9, wherein the physical location is a cell in a room.

12. The method of claim 1, wherein the point map is a portion of a larger point map.

13. The method of claim 1, wherein the first component is a head-mounted audio-visual display component of a mixed reality system, and
wherein the second component is a torso-mounted processing component of the mixed reality system.

14. The method of claim 1, further comprising the second component reconciling the second map change with the first map state before applying the second map change to the point map in the first map state.

15. The method of claim 1, the first and second components being communicatively coupled to a third component, the method further comprising:
the third component performing a third process on the point map in the first map state to generate a third map change;
the first and second components sending the first and second map changes to the third component, respectively; and
the third component applying the third map change to the second updated point map in the third map state to generate a third updated point map in a fourth map state.

16. The method of claim 15, wherein the first component is a head-mounted audio-visual display component of a mixed reality system,
wherein the second component is a torso-mounted processing component of the mixed reality system, and
wherein the third component is a cloud based processing component.

17. The method of claim 1, further comprising the second component receiving the first map change from the first component before generating the second map change.

18. The method of claim 1, the second component comprising removable media for data storage.

19. The method of claim 1, wherein the second process is selected from the group consisting of tracking, map point deletion, VIO, mapping, insertion of new keyframe/key rigframe, insertion of new map point, insertion of new observation, bundle adjustment, modification of sparse map geometry, online calibration, relocalization, adding new orb feature; add new BoW index; loop closure; modify sparse map geometry; map merge; and joint dense optimization.

* * * * *